United States Patent
Francis

(10) Patent No.: US 11,402,050 B1
(45) Date of Patent: Aug. 2, 2022

(54) PIPE FITTING INTERNAL LINER SYSTEMS AND METHODS

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

(*) Notice: Subject to any disclaimer, the term of this patent is extended or adjusted under 35 U.S.C. 154(b) by 0 days.

(21) Appl. No.: 17/177,682

(22) Filed: Feb. 17, 2021

(51) Int. Cl.
*F16L 58/18* (2006.01)

(52) U.S. Cl.
CPC .................................. *F16L 58/187* (2013.01)

(58) Field of Classification Search
CPC ......... F16L 58/187; F16L 33/01; F16L 33/22; F16L 33/28
USPC ....................................................... 285/45, 55
See application file for complete search history.

(56) References Cited

U.S. PATENT DOCUMENTS

| | | | |
|---|---|---|---|
| 1,702,619 A * | 2/1929 | Sargent, Jr. ............. | F04B 53/16 417/554 |
| 1,808,094 A * | 6/1931 | Yackey ................. | F16L 33/221 285/55 |
| 1,949,984 A | 3/1934 | Walker | |
| 2,610,869 A * | 9/1952 | Allison .................. | F16L 33/01 285/222.5 |
| 3,237,974 A * | 3/1966 | Press ................... | F16L 33/2073 285/222.4 |
| 6,467,812 B1 | 10/2002 | Klemm et al. | |
| 8,499,799 B2 * | 8/2013 | Saltel ..................... | F16L 33/01 138/109 |
| 2003/0047939 A1 * | 3/2003 | Whitehead ............ | F16L 55/165 285/55 |
| 2004/0066035 A1 * | 4/2004 | Buon .................... | F16L 11/083 285/222.2 |

FOREIGN PATENT DOCUMENTS

| | | | | |
|---|---|---|---|---|
| CN | 101922594 A | | 12/2010 | |
| GB | 367948 A | * | 3/1932 | ............ F16L 58/188 |
| GB | 805911 A | * | 12/1958 | .............. F16L 33/01 |

* cited by examiner

*Primary Examiner* — Matthew Troutman
*Assistant Examiner* — Fannie C Kee
(74) *Attorney, Agent, or Firm* — Conrad J. Hsu

(57) ABSTRACT

Techniques for implementing and/or operating a pipeline system. The pipeline system includes a pipe segment, in which the pipe segment includes tubing that defines a pipe bore and a fluid conduit in a tubing annulus, and a pipe fitting to be secured to the pipe segment. The pipe fitting includes a fitting body that defines a fitting bore, a fitting jacket implemented circumferentially around the fitting body to define a tubing cavity, in which the tubing of the pipe segment is to be inserted into the tubing cavity and the fitting jacket is to be conformally deformed around the tubing of the pipe segment, and a fitting liner secured in the fitting bore of the pipe fitting such that a body section of the fitting liner is secured directly against the fitting body to facilitate blocking a solid particle in a slurry that flows therethrough from contacting the fitting body.

19 Claims, 11 Drawing Sheets

PIPE FITTING INTERNAL LINER SYSTEMS AND METHODS

BACKGROUND

The present disclosure generally relates to pipeline systems and, more particularly, to a pipe fitting (e.g., connector) that may be secured to a pipe segment deployed or to be deployed in a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to one or more pipe (e.g., midline and/or end) fittings, for example, which are used to fluidly couple a pipe segment to another pipe segment, to another pipe fitting, to a fluid source, and/or to a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid.

Nevertheless, in some instances, a pipeline system may be used to transport a slurry that includes solid particles suspended in fluid, such as gas and/or liquid. However, at least in some instances, a solid particle may erode a pipeline component, such as a pipe fitting or pipe segment tubing, when the solid particle contacts (e.g., rubs against) the pipeline component. To facilitate reducing erosion that results from parallel slurry flows, an inner layer of pipe segment tubing may be implemented using relatively smooth material, such as plastic. However, in some instances, a fitting body of a pipe fitting, which defines a fitting bore through the pipe fitting, may be implemented using material, such as metal, that is more susceptible to erosion due to parallel slurry flows. Accordingly, at least in some instances, implementing a pipe fitting to define its fitting bore using a material that is more susceptible to erosion as compared to the material used to define a pipe bore of a pipe segment may potentially prematurely shorten the lifespan of a pipeline system in which the pipe fitting and the pipe segment are deployed, for example, due to a slurry being conveyed by the pipeline system eroding through the pipe fitting before eroding through the tubing of the pipe segment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a pipe segment, in which the pipe segment includes tubing that defines a pipe bore and a fluid conduit in a tubing annulus of the tubing, and a pipe fitting to be secured to the pipe segment. The pipe fitting includes a fitting body that defines a fitting bore of the pipe fitting, a fitting jacket implemented circumferentially around the fitting body to define a tubing cavity, in which the tubing of the pipe segment is to be inserted into the tubing cavity and the fitting jacket is to be conformally deformed around the tubing of the pipe segment to facilitate securing the pipe fitting to the pipe segment, and a fitting liner secured in the fitting bore of the pipe fitting such that a body section of the fitting liner is secured directly against an inner surface of the fitting body to facilitate blocking a solid particle in a slurry that flows through the pipe fitting from contacting the fitting body of the pipe fitting.

In another embodiment, a method of implementing a pipeline system includes implementing a fitting body of a pipe fitting to define a fitting bore with a female taper, in which the pipe fitting is to be secured to a pipe segment at least in part by securing tubing of the pipe segment around the fitting body of the pipe fitting, implementing a fitting jacket circumferentially around the fitting body to define a tubing cavity in which the tubing of the pipe segment is to be secured and sealed, and implementing a fitting liner to be secured in the fitting bore of the pipe fitting such that an outer surface of the fitting liner includes a male taper that facilitates securing the fitting liner in the fitting bore of the pipe fitting at least in part by directly abutting the female taper implemented on an inner surface of the fitting body to facilitate blocking a slurry that flows through the pipe fitting from eroding the fitting body of the pipe fitting.

In another embodiment, a fitting liner, which to be secured within a fitting bore of a pipe fitting that is defined by a fitting body of the pipe fitting, includes a body section that is to directly abut an inner body surface of the fitting body. The body section of the fitting liner includes an outer liner surface having a male taper that matingly engages a female taper implemented along the inner body surface of the fitting body to facilitate anchoring the fitting liner in the pipe fitting while a solid particle passes through the pipe fitting to enable the fitting liner to block the solid particle from contacting the inner body surface of the fitting body and an inner liner surface that defines a liner bore including a cylindrical section that has a constant diameter to facilitate reducing occurrence of non-parallel slurry flows in the pipe fitting.

DETAILED DESCRIPTION

Figure 1:
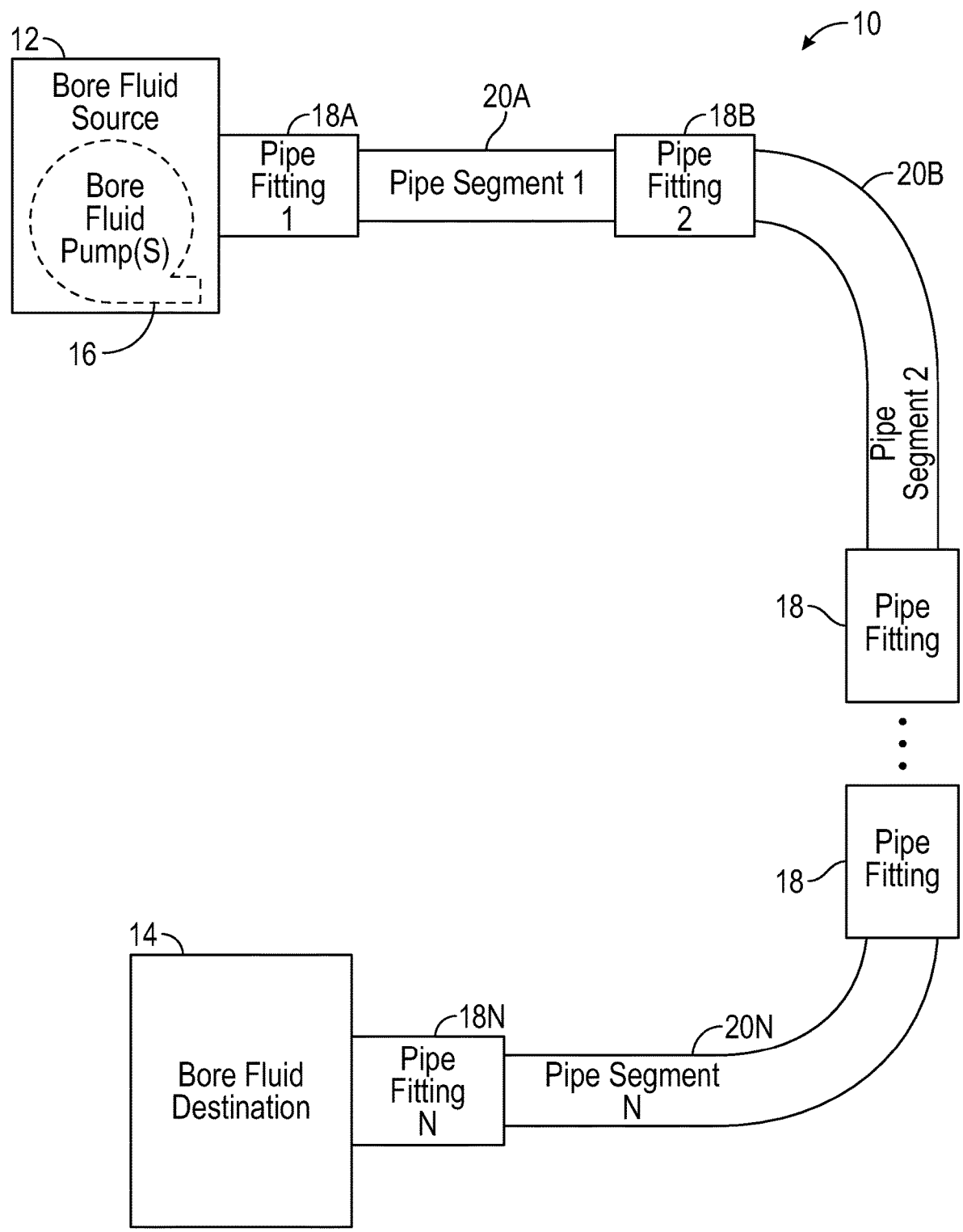
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, in some instances, a pipeline system may be used to transport (e.g., convey) a slurry that includes solid particles suspended in fluid, such as gas and/or liquid. For example, in a copper mining application, solid copper particles may be suspended in fluid, such as liquid sulfuric acid. As another example, in a gas production application performed in a desert environment, solid sand particles may be suspending in fluid, such as produced natural gas.

However, at least in some instances, a solid particle may erode (e.g., wear) away solid material of a pipeline component, such as pipe segment tubing or a pipe fitting, when the solid particle contacts (e.g., rubs against) the pipeline component. To facilitate reducing the erosion that results from parallel slurry flows, an inner surface of pipe segment tubing may be implemented to define its pipe bore using a relatively smooth material. For example, the inner surface of the pipe segment tubing may be implemented using plastic, such as high-density polyethylene (HDPE) and/or raised temperature polyethylene (PE-RT).

On the other hand, in some instances, a fitting body of a pipe fitting deployed in a pipeline system may be implemented to define a fitting bore through the pipe fitting using material that is more susceptible to erosion due to parallel slurry flows as compared to the material used to implement an inner surface of pipe segment tubing that is deployed in the pipeline system. For example, the inner surface of the pipe segment tubing may be implemented using plastic while the fitting body of the pipe fitting is implemented using metal, such as carbon steel, stainless steel, duplex stainless steel, super duplex stainless steel, or any combination thereof. As such, at least in some instances, implementing a pipe fitting to define a fitting bore using material that is more susceptible to erosion due to a parallel slurry flow may potentially prematurely shorten the lifespan of a pipeline system in which the pipe fitting is deployed, for example, due to the parallel slurry flow eroding through the pipe fitting before eroding through the tubing of a pipe segment deployed in the pipeline system.

Accordingly, to facilitate improving pipeline lifespan, the present disclosure provides techniques for implementing and/or deploying a pipe fitting with a fitting liner. In particular, to facilitate improving pipeline lifespan, a fitting liner may be implemented to be secured within a fitting bore that is defined by the fitting body of a pipe fitting, thereby effectively limiting the fitting bore to a liner bore defined by the fitting liner. In other words, as will be described in more detail below, the fitting liner may be implemented to be secured between the fitting body and a bore through the pipe fitting such that the fitting liner at least partially covers the fitting body, thereby facilitating a reduction in the likelihood and/or the amount of solid particles in a slurry flow that contact and, thus, erode the fitting body of the pipe fitting, which, at least in some instances, may facilitate improving the lifespan of the pipe fitting and, thus, a pipeline system in which the pipe fitting is deployed.

To facilitate improving the lifespan of a fitting liner and, thus, a pipe fitting in which it is secured, in some embodiments, the fitting liner may be implemented with material that is less susceptible to erosion due to a parallel slurry flow as compared to the material that is used to implement the fitting body of the pipe fitting. For example, the fitting liner may be implemented using a ceramic material and/or a polymer material while the fitting body is implemented using metal, such as steel. In fact, to facilitate further improving lifespan of a pipe fitting, in some embodiments, a fitting liner may be implemented such that it is replaceable after initially being secured in the pipe fitting. In other words, in such embodiments, a fitting liner may be implemented to be selectively secured within a pipe fitting and/or selectively removed from within the pipe fitting. In particular, in some such embodiments, a fitting liner may be selectively replaced based at least in part on as associated erosion state, which is indicative of its remaining thickness, as compared to a threshold erosion state, which is indicative of a threshold (e.g., minimum) thickness for the fitting liner.

In some embodiments, the erosion state of a fitting liner may be determined at least in part using non-destructive testing (NDT) techniques, such as ultrasound testing techniques, which determine material thickness. To facilitate determining its erosion state, in some embodiments, a wear sensor may additionally or alternatively be embedded within the fitting liner. Moreover, in some embodiments, a fitting liner may additionally or alternatively be implemented with multiple wear indicating layers, for example, which have differing colors and/or differing patterns to enable a user (e.g., operator), such as a service technician, to visually determine the erosion state of the fitting liner.

In any case, to facilitate improving lifespan of a fitting liner, the body section of the fitting liner, which is to be secured against the fitting body of a pipe fitting, may be implemented to define the liner bore therethrough with a substantially (e.g., relatively) constant diameter, for example, to facilitate reducing the likelihood that the fitting liner causes a perpendicular slurry flow. Moreover, to facilitate securing a fitting liner to a pipe fitting, an outer surface of the fitting liner may be implemented to conform with an inner surface of the fitting body of the pipe fitting, for example, to facilitate securing the fitting liner to the fitting body via an interference (e.g., friction and/or press) fit. Merely as an illustrative non-limiting example, when the fitting body is implemented to define a fitting bore with a female taper, the outer surface of the fitting liner may be implemented with a male taper. Thus, when force is exerted on the fitting liner in an axial direction from the male taper toward the female taper, the male taper of the fitting liner may push against the female taper of the fitting body and, thus, facilitate maintaining the fitting liner in the pipe fitting, for example, instead of being pushed into the tubing of a pipe segment that is secured to the pipe fitting.

In some embodiments, a pipe fitting may be secured to the tubing of a pipe segment using swaging techniques. To facilitate securing a pipe fitting to pipe segment tubing using swaging techniques, the pipe fitting may include a fitting jacket, which is implemented circumferentially around the fitting body of the pipe fitting to define a tubing cavity, for example, as well as a cavity seal, which is implemented circumferentially around the fitting body to facilitate sealing the pipe segment tubing in the tubing cavity. The pipe segment tubing may then be inserted into the tubing cavity of the pipe fitting and special-purpose deployment equipment—namely a swage machine—may be operated to conformally deform the fitting jacket of the pipe fitting around the pipe segment tubing.

To facilitate conformally deforming the fitting jacket of a pipe fitting around the tubing of a pipe segment, in some embodiments, a swage machine may include a grab plate and a die plate in which one or more dies may be loaded. In particular, in such embodiments, the swage machine may conformally deform the fitting jacket at least in part by causing its grab plate and its die plate to move toward one another such that the one or more dies loaded in the die plate pass over the fitting jacket in an axial direction toward the grab plate and/or such that the fitting jacket passes through the one or more dies loaded in the die plate in an axial direction away from the grab plate. In fact, to facilitate securing a swage machine thereto, in some embodiments, the fitting body of a pipe fitting may include a fitting tube, which defines its fitting bore, and a grab ring, which is implemented circumferentially around the fitting tube and to matingly interlock with the grab plate of the swage machine.

In addition to a pipe segment, a pipe fitting may be secured to another pipeline component, such as a fluid source, a fluid destination, or another pipe fitting. In any case, the other pipeline component may include solid material that is implemented to define a pipeline bore, which is to be fluidly coupled to a bore of the pipe fitting. To facilitate maintaining the fitting liner secured in the pipe fitting, in some embodiments, the fitting liner may be implemented such that it directly abuts the solid material of the other pipeline component in an axial direction when the fitting liner is secured to the pipe fitting and the pipe fitting is secured to the other pipeline component.

To facilitate securing a pipe fitting to another pipeline component while enabling a fitting liner secured therein to be selectively replaced, in some embodiments, the pipe fitting may include a flange implemented circumferentially around its fitting body. Additionally, in some such embodiments, the pipe fitting may include one or more threaded fasteners, which are each implemented to be secured in or to facilitate securing another threaded fastener in a fastener opening implemented in the flange of the pipe fitting as well as a corresponding fastener opening implemented in the other pipeline component. For example, the one or more threaded fasteners of a pipe fitting may include one or more bolts and/or one or more nuts. However, in other such embodiment, the flange of a pipe fitting may be a hub flange, such as a Vector Techlok® flange, a Grayloc® flange, or the like, that is implemented to be secured to another pipeline component via a hub clamp, such as a Vector Techlok® clamp, a Grayloc® clamp, or the like.

In any case, as described above, a fitting liner may be secured between a fitting body and a bore of a pipe fitting to facilitate reducing the likelihood and/or the amount of solid particles in a slurry flow that contact and, thus, erode the fitting body. To facilitate reducing the likelihood that the slurry flow separates the fitting liner from the fitting body, in some embodiments, the fitting liner may include a tapered (e.g., beveled) end, which is implemented to gradually transition from the inner surface diameter of a pipe bore that is defined by pipe segment tubing secured to the pipe fitting to a substantially (e.g., relatively) constant inner surface diameter of the liner bore that is defined by a body section of the fitting liner. Additionally or alternatively, to facilitate reducing the likelihood that the slurry flow separates the fitting liner from the fitting body, the pipe fitting may include a liner seal, which is implemented to be compressed between an inner surface of the fitting body and an outer surface of the fitting liner.

Furthermore, to facilitate maintaining a fitting liner secured against the fitting body of a pipe fitting, in some embodiments, the fitting liner may be implemented to extend beyond the fitting body, for example, such that an outer surface of an end section of the fitting liner engages the inner surface of pipe segment tubing that is secured to the pipe fitting. In particular, in some such embodiments, open space may be present between the end section of the fitting liner and the pipe segment tubing when the fitting liner is initially disposed in (e.g., inserted into) the pipe fitting. As such, to facilitate engaging the fitting liner with the pipe segment tubing, in some such embodiments, a packer (e.g., inflatable bladder) assembly may then be inserted into the liner bore defined by the fitting liner and operated to expand (e.g., push and/or force) the end section of the fitting liner outwardly in a radial direction such that the end section of the fitting liner engages (e.g., contacts) the pipe segment tubing and, thus, covers a nose (e.g., end) of the fitting body.

Moreover, in some embodiments, multiple (e.g., two) instances of a pipe fitting implemented in accordance with the techniques of the present disclosure may be secured back-to-back (e.g., flange-to-flange), for example, to effectively implement a midline pipe fitting. In particular, in some embodiments, each pipe fitting may include its own fitting liner. To facilitate securing the fitting liners in corresponding pipe fittings, in some such embodiments, a pipeline system may additionally include a discrete retainer ring, which includes a flange section that is implemented to be secured between the flanges of the pipe fittings and a bore section that is implemented to be secured within the fitting bores of the pipe fitting such that an outer surface of the bore section directly abuts the inner surfaces of the fitting liners.

However, to facilitate reducing component count and/or points of discontinuity in a pipeline system, in other embodiments, multiple pipe fittings may share a fitting liner. In other words, in such embodiments, the fitting liner of a pipe fitting may be implemented to be secured in the fitting bore of the pipe fitting as well as another fitting bore of another pipe fitting that is to be secured to the pipe fitting. Additionally or alternatively, in other embodiments, a retainer ring may be integrated with a fitting liner of a pipe fitting such that the fitting liner includes a flange section, which is implemented to be secured between a flange of the pipe fitting and another pipeline component, in addition to a body section, which is implemented to be secured against the fitting body of the pipe fitting. In this manner, as will be described in more detail below, the present disclosure provides techniques for implementing and/or deploying a pipe fitting with a fitting liner, which, at least in some instances, may facilitate improving the lifespan of the pipe fitting and, thus, a pipeline system in which the pipe fitting is deployed, for example, at least in part by reducing the likelihood and/or amount of solid particles in a slurry flow that contact and, thus, erode the fitting body of the pipe fitting.

To help illustrate, an example of a pipeline system 10 is shown in FIG. 1. As depicted, the pipeline system 10 is coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof. Moreover, in other embodiments, the pipeline system 10 may be used to transport a slurry that includes solid particles suspended in fluid, such as liquid and/or gas, for example, in a mining application and/or a hydrocarbon production application that is performed in a desert environment.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., one or two) pipe segments 20 or more than three (e.g., four, five, or more) pipe segment 20. Additionally or alternatively, in other embodiments, a pipeline system 10 may include fewer than five (e.g., one, two, three, or four) pipe fittings 18 or more than five (e.g., six, seven, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, at least in part by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
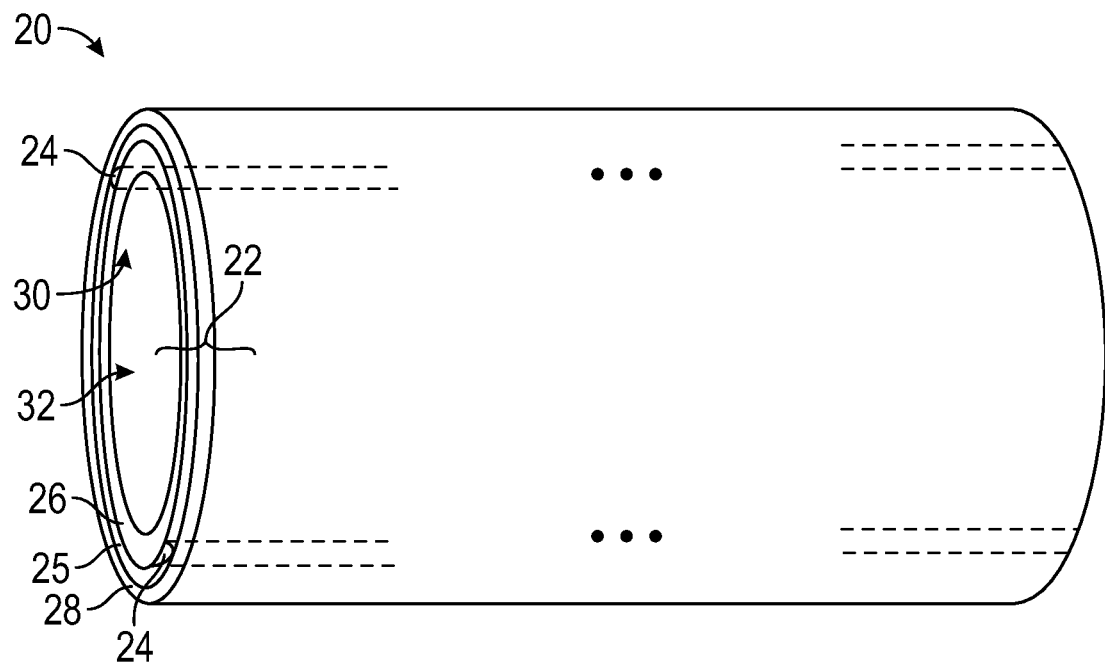
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in a tubing annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate (e.g., reinforcement) layers of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, as compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer than two (e.g., one) or more than two (e.g., three, four, or more) fluid conduits 24 defined in its tubing annulus 25. Additionally, in other embodiments, a fluid conduit 24 defined in a tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
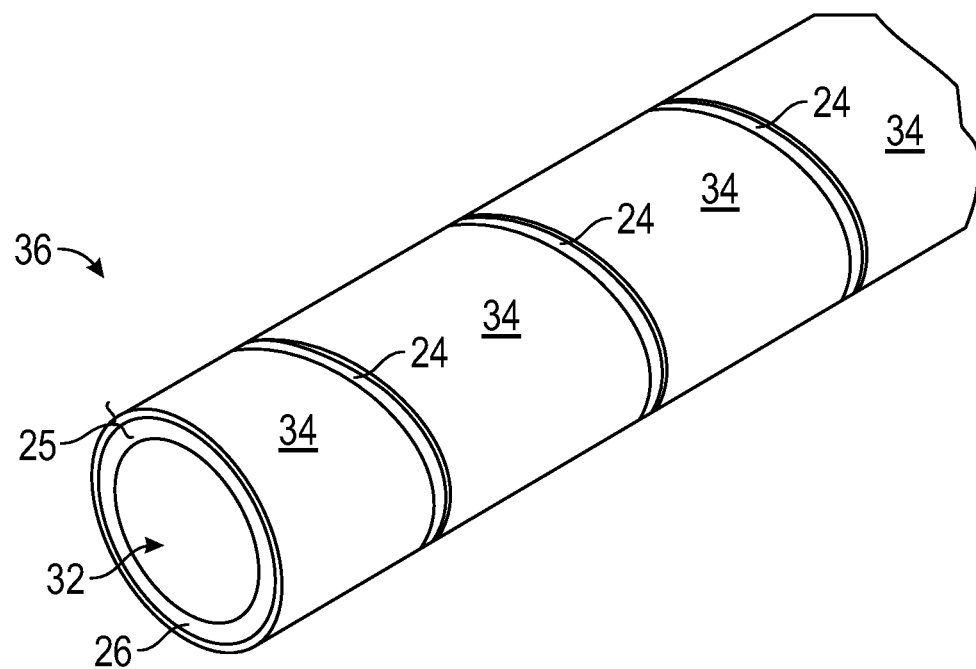
FIG. 3 is a perspective view of an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate (e.g., reinforcement) layer 34 included in a tubing annulus 25 of its pipe segment tubing 22, is shown in FIG. 3. In some embodiments, one or more intermediate layers 34 of the pipe segment tubing 22 may be implemented using composite material and/or metal, such as carbon steel, stainless steel, duplex stainless steel, super duplex stainless steel, or any combination thereof. In other words, at least in some such embodiments, an intermediate layer 34 of the pipe segment tubing 22 may be implemented using electrically conductive material, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a solid strip of material around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34. In any case, to facilitate flowing fluid from a bore fluid source 12 to a bore fluid destination 14, as described above, the tubing 22 of a pipe segment 20 may be secured to one or more pipe fittings 18.

Figure 4:
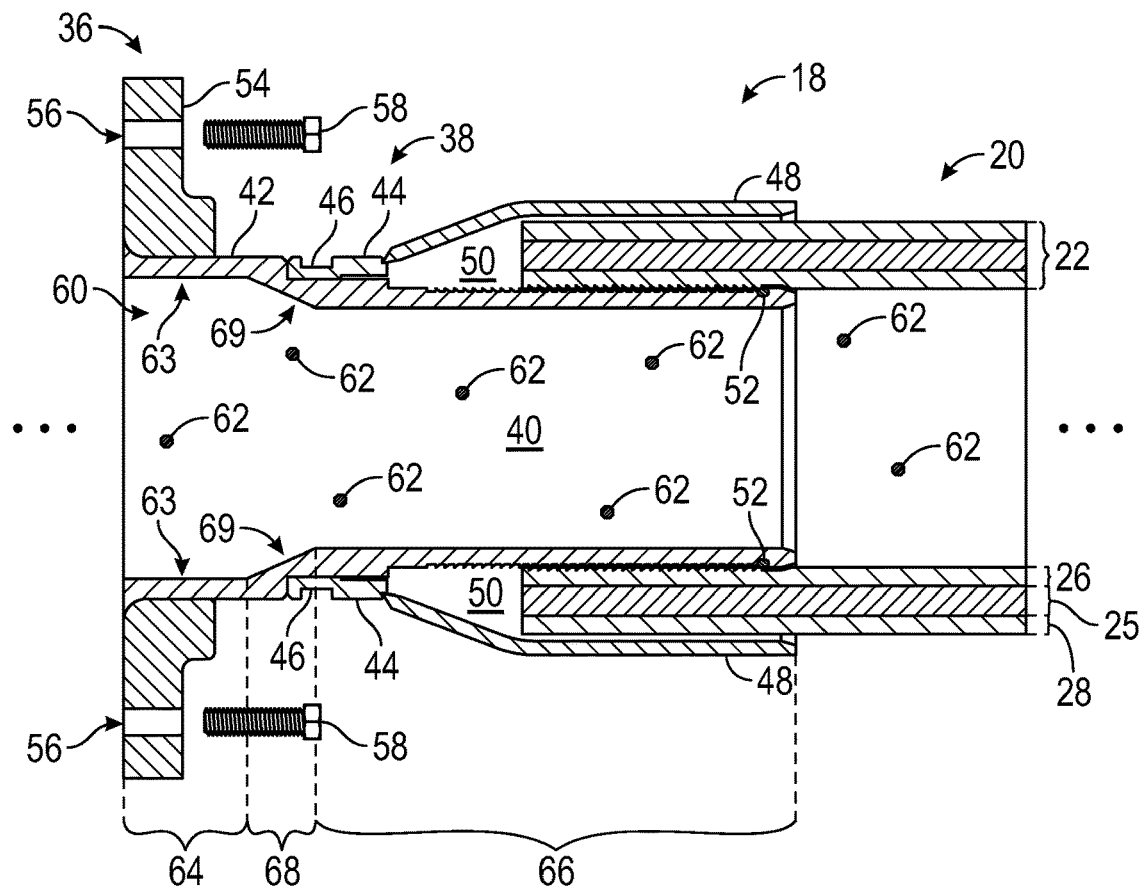
FIG. 4 is an axial cross-section profile of an example of a portion of the pipeline system of FIG. 1 that includes a pipe fitting and a pipe segment, in accordance with an embodiment of the present disclosure.

To help illustrate, an example of a portion 36 of a pipeline system 10, which includes a pipe fitting 18 secured to the tubing 22 of a pipe segment 20, is shown in FIG. 4. As depicted, the pipe fitting 18 includes a fitting body 38, which is implemented to define (e.g., enclose) a fitting bore 40 through the pipe fitting 18. In particular, as in the depicted example, in some embodiments, the fitting body 38 of a pipe fitting 18 may include a fitting tube 42, which is implemented to define its fitting bore 40, and a grab ring 44, which is implemented circumferentially around the fitting tube 42. More specifically, in some such embodiments, the grab ring 44 may include a grab notch 46, which is implemented to matingly interlock (e.g., engage and/or interface) with a grab tab on a grab plate of a swage machine that is implemented and/or operated to facilitate securing the pipe fitting 18 to the tubing 22 of the pipe segment 20.

However, it should be appreciated that the depicted example is merely intended to be illustrative and not limiting. In particular, in other embodiments, the fitting body 38 of a pipe fitting 18 may not include a grab ring 44. Additionally or alternatively, in other embodiments, the fitting tube 42 of a pipe fitting 18 may be implemented using multiple initially discrete components, for example, which are secured together via one or more weldments and/or one or more interference (e.g., press and/or friction) fits.

In any case, as depicted, the pipe fitting 18 additionally includes a fitting jacket 48, which is implemented circumferentially around the fitting body 38. In particular, as depicted, implementing the pipe fitting 18 in this manner defines a tubing cavity 50 between the fitting jacket 48 and the fitting body 38 in which pipe segment tubing 22 may be secured and sealed. Furthermore, as depicted, the pipe fitting 18 additionally includes a cavity seal 52 implemented circumferentially around its fitting body 38. In particular, in some embodiments, the cavity seal 52 may be an O-ring seal or a belt seal that is implemented at least in part using an elastic material, such as rubber. Thus, to facilitate securing and sealing the tubing 22 of the pipe segment 20 therein, in some embodiments, the pipe fitting 18 may be swaged to conformally deform the fitting jacket 48 around the tubing 22 of the pipe segment 20 such that an inner surface of the fitting jacket 48 engages the outer layer 28 of the pipe segment tubing 22, an outer surface of the fitting body 38 engages the inner layer 26 of the pipe segment tubing 22, and the cavity seal 52 is compressed between the outer surface of the fitting body 38 and the inner layer 26 of the pipe segment tubing 22.

In addition to a pipe segment 20, as will be described in more detail below, the pipe fitting 18 may be secured to another pipeline component, such as another pipe fitting 18, a bore fluid source 12, or a bore fluid destination 14. In other words, in some embodiments, the pipe fitting 18 of FIG. 4 may be an pipe end fitting 18. However, as will be described in more detail below, in some embodiments, multiple instances of a pipe fitting 18 implemented in accordance with the techniques of the present disclosure may be secured together back-to-back (e.g., flange-to-flange) to effectively implement a midline pipe fitting 18.

To facilitate securing a pipe fitting 18 to another pipeline component, as in the depicted example, in some embodiments, the pipe fitting 18 may include a flange 54, which has one or more fastener openings 56, secured to its fitting body 38. Additionally, as in the depicted example, in some embodiments, a pipe fitting 18 may include one or more threaded fasteners 58. In particular, as in the depicted example, the one or more threaded fasteners 58 of a pipe fitting 18 may include one or more bolts.

However, it should again be appreciated that the depicted example is merely intended to be illustrative and not limiting. In particular, in other embodiments, a pipe fitting 18 may not include a flange 54 and/or a threaded fastener 58, for example, when the pipe fitting 18 is implemented to be secured to another pipeline component via a weldment. Additionally, in other embodiments, the flange 54 of a pipe fitting 18 may not include fastener openings 56, for example, when the flange 54 is a hub flange, such as a Vector Techlok® flange, a Grayloc® flange, or the like, that is implemented to be secured to another pipeline component via a hub clamp, such as a Vector Techlok® clamp, a Grayloc® clamp, or the like. Furthermore, in some embodiments, a pipe fitting 18 may additionally include a vent (e.g., fluid) port, which is fluidly coupled to its tubing cavity 50, for example, to facilitate venting fluid present in the tubing cavity 50 and, thus, the tubing annulus 25 of pipe segment tubing 22 that is secured in the tubing cavity 50. Moreover, as will be described in more detail below, in some embodiments, the one or more threaded fasteners 58 of a pipe fitting 18 may additionally or alternatively include one or more nuts.

In any case, as depicted, the portion 36 of the pipeline system 10 is being used to transport (e.g., convey) a slurry 60, which includes solid particle 62 suspended in fluid, such as liquid and/or gas. For example, in a copper mining application, the solid particles 62 in the slurry 60 may include solid copper particles 62 suspended in liquid sulfuric acid. As another example, in a gas production application performed in a desert environment, the solid particles 62 in the slurry 60 may be solid sand particles 62 suspended in produced natural gas.

However, at least in some instances, a solid particle 62 may erode (e.g., wear) away solid material of a pipeline component, such as a pipe fitting 18 or pipe segment tubing 22, when the solid particle contacts (e.g., rubs against) the pipeline component, thereby potentially reducing the remaining lifespan of the pipeline component. As described above, to facilitate reducing erosion that results due to parallel slurry flows, the inner layer 26 of pipe segment tubing 22 may be implemented using a relatively smooth material, such as plastic. However, the fitting body 38 of a pipe fitting 18 may be implemented using material, such as metal, that is more susceptible to erosion due to parallel slurry flows as compared to the relatively smooth material used to implement the inner layer 26 of the pipe segment tubing 22, which, at least in some instances, may potentially limit the lifespan of the pipe fitting 18 and, thus, a pipeline system 10 in which the pipe fitting 18 is deployed.

Moreover, as in the depicted example, in some embodiments, the inner surface 63 of a fitting body 38 may be implemented to define a fitting bore 40 that has a larger diameter in a first end (e.g., flange end) section 64 of the pipe fitting 18, a smaller diameter in a second end (e.g., pipe segment end) section 66 of the pipe fitting 18, and gradually transitions between the larger diameter and the smaller diameter in an intermediate section 68 of the pipe fitting 18. In other words, in the depicted example, the fitting body 38 of the pipe fitting 18 is implemented to define the fitting bore 40 with a female taper 69. However, at least in some instances, a change in the diameter of a bore through which the slurry 60 flows may produce non-parallel (e.g., perpendicular) slurry flows (e.g., due to the Venturi effect), which may be more prone to eroding the relatively smooth material used to implement the inner layer 26 of pipe segment tubing 22 as compared to parallel slurry flows, thereby potentially limiting the lifespan of the pipe segment tubing 22 and, thus, a pipeline system 10 in which the pipe segment tubing 22 and the pipe fitting 18 are deployed.

Accordingly, to facilitate improving pipeline lifespan, the present disclosure provides techniques for implementing and/or deploying a pipe fitting 18 with a fitting liner. As will be described in more detail below, in some embodiments, the fitting liner may be implemented with material that is less susceptible to erosion by solid particles 62 in a slurry 60 as compared to the material that is used to implement the fitting body 38 of the pipe fitting 18. Additionally, as will be described in more detail below, the fitting liner may be implemented to be secured between the fitting body 38 and a bore through the pipe fitting 18, which, at least in some instances, may facilitate reducing the likelihood and/or the amount of solid particles 62 in a slurry flow that contact the fitting body 38 and, thus, improving the lifespan of the pipe fitting 18.

Figure 5:
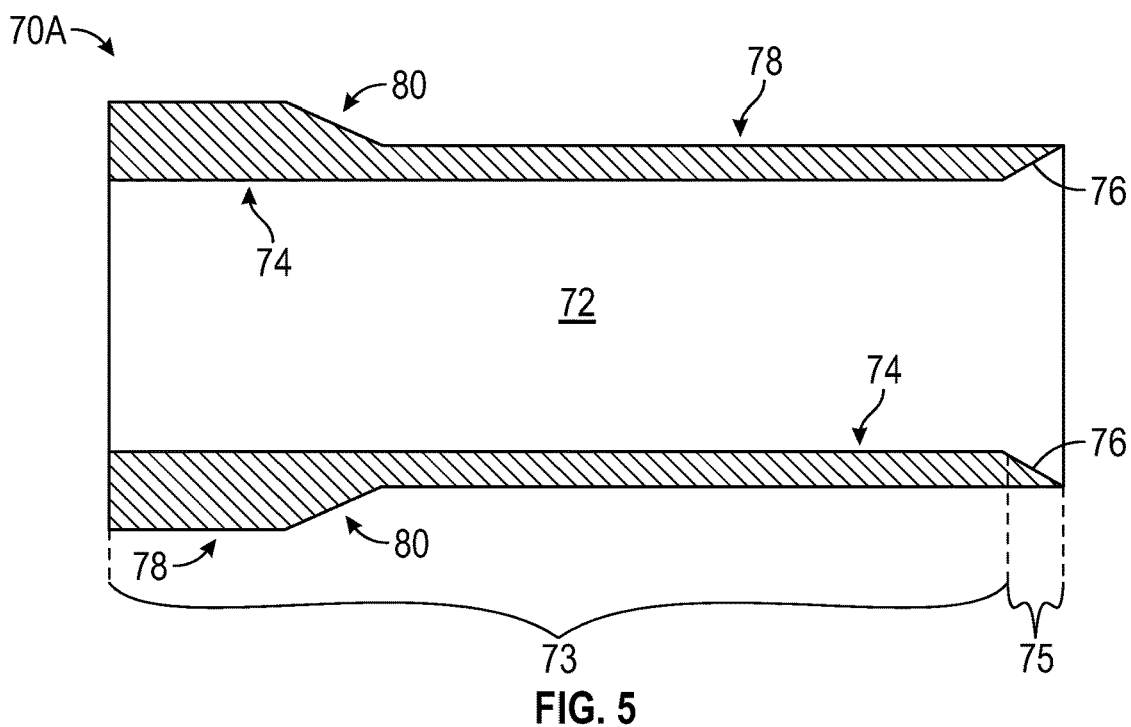
FIG. 5 is an axial cross-section profile of an example of a fitting liner that may be secured in the pipe fitting of FIG. 4, in accordance with an embodiment of the present disclosure.

To help illustrate, an example of a fitting liner 70A, which may be deployed in the portion 36 of the pipeline system 10 in FIG. 4, is shown in FIG. 5. As depicted, the fitting liner 70A is implemented to define (e.g., enclose) a liner bore 72. In particular, as depicted, an inner surface 74 of the fitting liner 70A is implemented to define the liner bore 72 such that it has a substantially (e.g., relatively) constant diameter along a majority of its length, which, at least in some instances, may facilitate reducing the presence of non-parallel (e.g., perpendicular) slurry flows in the pipeline system 10. However, as in the depicted example, in some embodiments, a fitting liner 70 may additionally include a tapered (e.g., beveled) end 76 that is implemented with a female taper, for example, to facilitate gradually transitioning between the substantially constant diameter of the liner bore 72 and the diameter of a fitting bore 40 or a pipe bore 32 that is fluidly coupled thereto. In other words, as in the depicted example, in such embodiments, the fitting liner 70A is implemented to define the liner bore 72 with a cylindrical (e.g., substantially constant diameter) section 73 and a coned section 75, which corresponds with the tapered end 76 of the fitting liner 70A.

Additionally, as in the depicted example, in some embodiments, the outer surface 78 of a fitting liner 70 may be implemented to include a male taper 80. As described above, in some embodiments, the fitting body 38 of a pipe fitting 18 may be implemented to define a fitting bore 40 with a female taper 69. In other words, in some embodiments, the outer surface 78 of the fitting liner 70A may matingly conform with the inner surface 63 of the fitting body 38 and, thus, facilitate securing the fitting liner 70A to the fitting body 38, for example, via an interference (e.g., press and/or friction) fit.

However, it should be appreciated that the depicted example is merely intended to be illustrative and not limiting. In particular, in other embodiments, the outer surface 78 of a fitting liner may be implemented with a different shape, for example, when the inner surface 63 of a corresponding fitting body 38 is implemented with a different shape. Additionally or alternatively, in other embodiments, a fitting liner 70 may be implemented with a squared end instead of a tapered end 76.

In any case, to facilitate improving lifespan of a pipe fitting 18 in which it is to be secured, in some embodiments, a fitting liner 70 may be implemented with a material that is less susceptible to erosion due to parallel slurry flows as compared to the material that is used to implement the fitting body 38 of the pipe fitting 18. For example, the fitting body 38 may be implemented using metal while the fitting liner 70 is implemented using a ceramic material and/or a polymer material, such as high-density polyethylene (HDPE). However, in other embodiments, a fitting liner 70 may be implemented using the same material as used to implement the fitting body 38 of a pipe fitting 18 in which it is to be secured, for example, when the fitting liner 70 can be replaced without replacing the fitting body 38. Merely as an illustrative non-limiting example, the fitting liner 70 and the fitting body 38 may both be implemented at least in part using steel.

Additionally or alternatively, in some embodiments, a fitting liner 70 may be implemented at least in part using a swellable material, which swells in size in the presence of fluid that is expected to be transported via a pipe fitting 18 in which the fitting liner 70 is to be secured, for example, to facilitate producing an interference (e.g., press and/or friction) fit between the fitting liner 70 and the fitting body 38 of the pipe fitting 18. Merely as an illustrative non-limiting example, in a copper mining application, the fitting liner 70 may be implemented using a material that swells in the presence of sulfuric acid. In this manner, a fitting liner 70 may be implemented to enable the fitting liner 70 to be secured at least partially between the fitting body 38 and a bore through the pipe fitting 18, which, at least in some instances, may facilitate reducing the likelihood and/or the amount of solid particles 62 in a slurry 60 that contact and, thus, erode the fitting body 38 of the pipe fitting 18.

Figure 6:
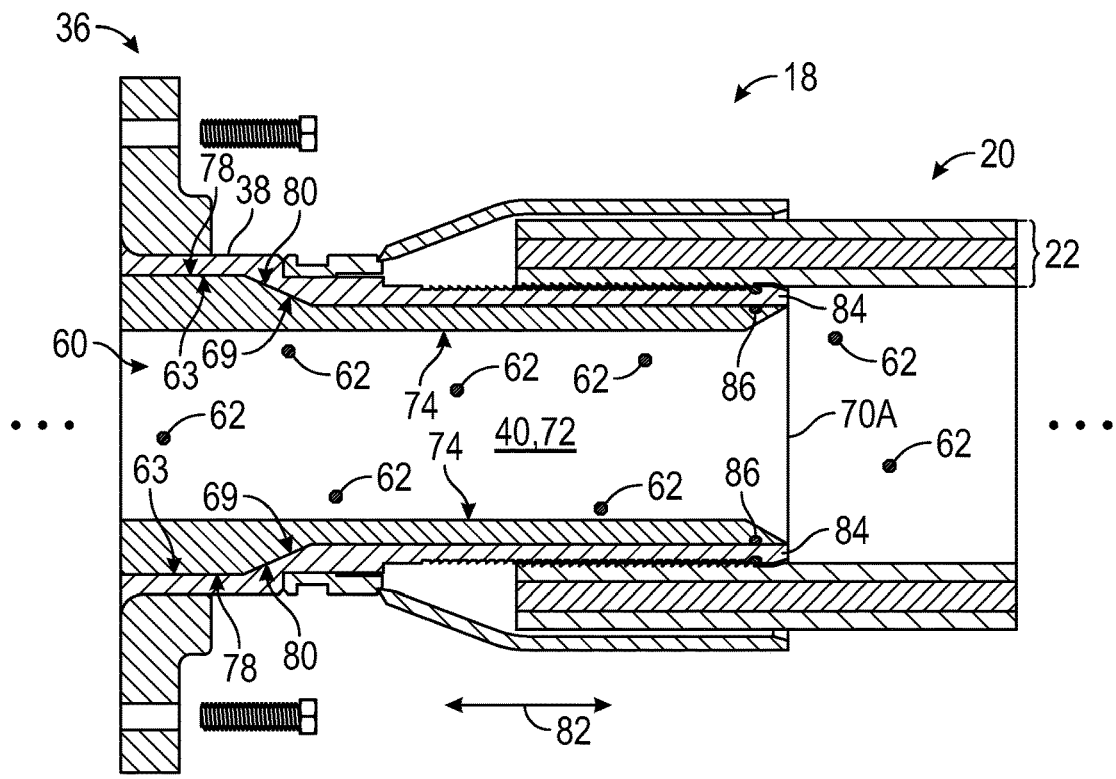
FIG. 6 is an axial cross-section profile of an example of the portion of the pipeline system of FIG. 4 with the fitting liner of FIG. 5 secured therein, in accordance with an embodiment of the present disclosure.

To help illustrate, an example of the portion 36 of the pipeline system 10 in FIG. 4 with the fitting liner 70A of FIG. 5 secured therein is shown in FIG. 6. As depicted, the fitting liner 70A is secured in the pipe fitting 18 such that the outer surface 78 of the fitting liner 70A directly abuts the inner surface 63 of the fitting body 38 of the pipe fitting 18. In other words, the fitting liner 70A may be secured between the fitting body 38 and the fitting bore 40 defined by the fitting body 38, thereby at least partially covering the inner surface 63 of the fitting body 38 and effectively limiting the fitting bore 40 to the liner bore 72 defined by the fitting liner 70A, which, at least in some instances, may reduce the likelihood and/or amount of solid particles 62 in a slurry 60 that contact the fitting body 38 while flowing through the pipe fitting 18.

In particular, as depicted, the fitting liner 70A is secured in the pipe fitting 18 such that the male taper 80 on its outer surface 78 directly abuts the female taper 69 on the inner surface 63 of the fitting body 38. As such, when force is exerted on the fitting liner 70A in an axial direction 82 from the male taper 80 toward the female taper 69 (e.g., due to a slurry flow), the male taper 80 of the fitting liner 70A may push against the female taper 69 of the fitting body 38. In other words, implementing a pipe fitting 18 in this manner may facilitate anchoring (e.g., securing and/or retaining) its fitting liner 70 in the pipe fitting 18 and, thus, reducing the likelihood that the fitting liner 70 is inadvertently pushed out of the pipe fitting 18 into the tubing 22 of the pipe segment 20 that is secured to the pipe fitting 18.

However, as in the depicted example, in some embodiments, a nose 84 of the fitting body 38 may nevertheless remain exposed to the slurry 60 and, thus, the solid particles 62 suspended in the slurry 60. As such, to facilitate improving the lifespan of the fitting body 38, in some such embodiments, the nose 84 of the fitting body 38 may be coated with material that is less susceptible to erosion due to a slurry flow as compared a base material that is used to implement the fitting body 38. For example, the base material of the fitting body 38 may be steel while the coating material disposed on its nose 84 is tungsten carbide and/or chromium.

Moreover, to facilitate reducing the likelihood that a slurry flow causes the fitting liner 70A to separate from the fitting body 38 and, thus, the likelihood that solid particles 62 in the slurry flow contact the base material of the fitting body 38, as in the depicted example, in some embodiments, a pipe fitting 18 may additionally include a liner seal 86, which is implemented circumferentially around its fitting liner 70. In particular, in some such embodiments, the liner seal 86 may be a O-ring seal or a belt seal that is implement at least in part using elastic material, such as rubber. Accordingly, to facilitate reducing the likelihood that the slurry flow contacts the base material of the fitting body 38, in such embodiments, the fitting liner 70 may be secured in the pipe fitting 18 such that the liner seal 86 is compressed between the outer surface 78 of the fitting liner 70 and the inner surface 63 of the fitting body 38. In this manner, a pipe fitting 18 may be implemented with a fitting liner 70, which, at least in some instances, may facilitate improving the lifespan of the pipe fitting 18 and, thus, the lifespan of a pipeline system 10 in which the pipe fitting 18 is deployed, for example, at least in part by reducing the amount of erosion that a slurry flow produces in the fitting body 38 of the pipe fitting 18.

However, it should be appreciated that the depicted example is merely intended to be illustrative and not limiting. In particular, in other embodiments, a fitting liner 70 secured in a pipe fitting 18 may extend beyond the fitting body 38 of the pipe fitting 18, for example, into the fitting body 38 of another pipe fitting 18 and/or such that an end section of the fitting liner 70 is secured against the inner surface of pipe segment tubing 22. Additionally or alternatively, a pipe fitting 18 and/or a fitting liner 70 may not include a liner seal 86, for example, when an end section of the fitting liner 70 is secured against the inner surface of pipe segment tubing 22.

Figure 7:
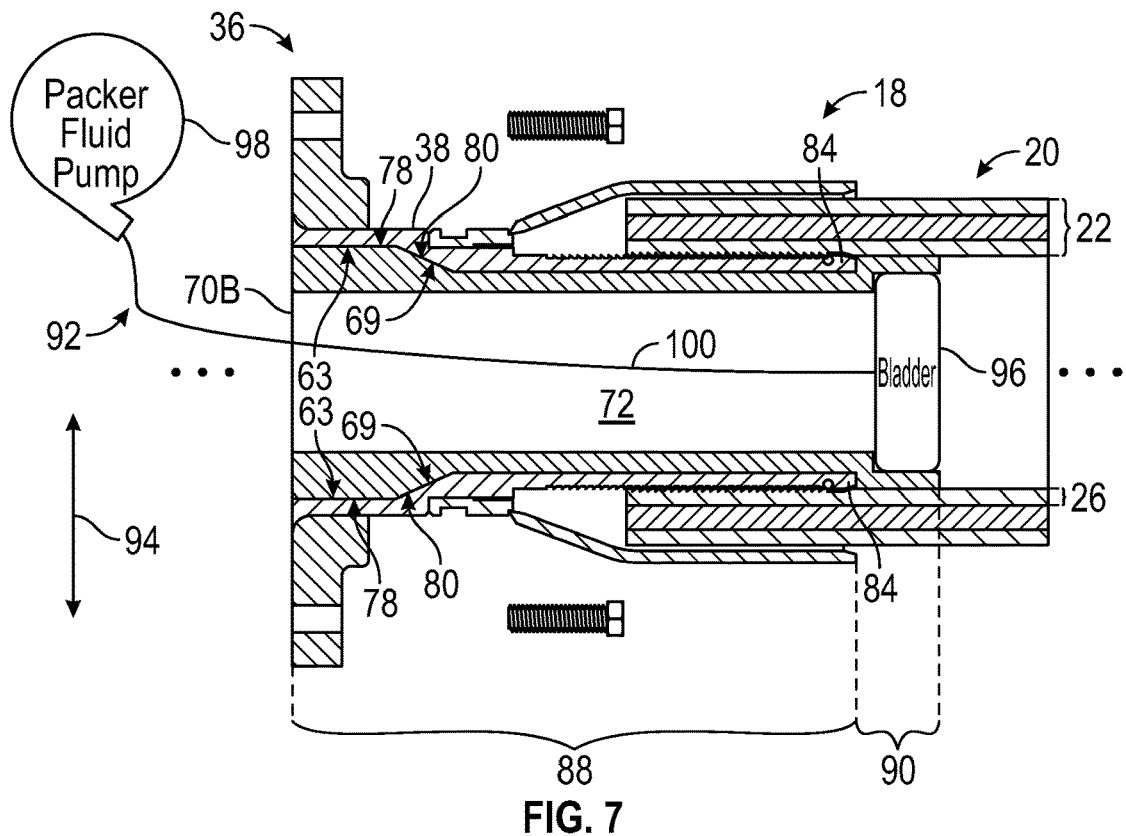
FIG. 7 is an axial cross-section profile another example of the portion of the pipeline system of FIG. 4 with another example of a fitting liner secured therein, in accordance with an embodiment of the present disclosure.

To help illustrate, an example of the portion 36 of the pipeline system 10 in FIG. 4 with another example of a fitting liner 70B secured therein is shown in FIG. 7. Similar to FIG. 6, as depicted in FIG. 7, the fitting liner 70B is secured in the pipe fitting 18 such that the outer surface 78 of the fitting liner 70B directly abuts the inner surface 63 of the fitting body 38 of the pipe fitting 18. In other words, the fitting liner 70B may be secured between the fitting body 38 and the fitting bore 40 defined by the fitting body 38, thereby at least partially covering the inner surface 63 of the fitting body 38 and effectively limiting the fitting bore 40 to the liner bore 72 defined by the fitting liner 70B, which, at least in some instances, may facilitate reducing the likelihood and/or the amount of solid particles 62 in a slurry 60 that contact the fitting body 38 while flowing through the pipe fitting 18.

In particular, similar to FIG. 6, the fitting liner 70B of FIG. 7 is secured in the pipe fitting 18 such that the male taper 80 on its outer surface 78 directly abuts the female taper 69 on the inner surface 63 of the fitting body 38. As such, when force is exerted on the fitting liner 70B in an axial direction 82 from the male taper 80 toward the female taper 69 (e.g., due to a slurry flow), the male taper 80 of the fitting liner 70B may push against the female taper 69 of the fitting body 38. In other words, implementing a pipe fitting 18 in this manner may facilitate anchoring (e.g., securing and/or retaining) its fitting liner 70 in the pipe fitting 18 and, thus, reducing the likelihood that the fitting liner 70 is inadvertently pushed out of the pipe fitting 18 into the tubing 22 of the pipe segment 20 that is secured to the pipe fitting 18.

However, in addition to a body section 88 that directly abuts the fitting body 38, as depicted in FIG. 7, the fitting liner 70B includes an end section 90 that is secured against the inner layer 26 of the pipe segment tubing 22. In particular, in some embodiments, the fitting liner 70B may be initially manufactured such that its end section 90 is a continuation of its body section 88 and, thus, may not engage (e.g., contact) the inner layer 26 of the pipe segment tubing 22 when the fitting liner 70B is initially inserted into the pipe fitting 18. Thus, to facilitate securing the end section 90 of the fitting liner 70B against the pipe segment tubing 22, as in the depicted example, in some such embodiments, special-purpose deployment equipment—namely a packer assembly 92—may be implemented and/or operated to facilitate expanding the end section 90 of the fitting liner 70B outwardly in a radial direction 94 toward the inner layer 26 of the pipe segment tubing 22.

However, it should be appreciated that the depicted example is merely intended to be illustrative and not limiting. In particular, in other embodiments, other types of special-purpose deployment equipment, such as a swage machine, may be used in addition to or as an alternative to a packer assembly 92 to facilitate securing the end section 90 of a fitting liner against the inner layer 26 of pipe segment tubing 22. Additionally or alternatively, in other embodiments, a fitting liner 70 may be initially manufactured (e.g., molded and/or milled) to have the shape depicted in FIG. 7.

In any case, as in the example depicted in FIG. 7, to facilitate expanding the end section 90 of a fitting liner 70 outwardly, in some embodiments, a packer assembly 92 may include an inflatable bladder 96 and a packer fluid pump 98, which is fluidly coupled to the inflatable bladder 96 via one or more packer fluid conduits 100. Generally, the size of the inflatable bladder 96 may expand when fluid is supplied thereto, for example, via the packer fluid pump 98. On the other hand, the size of the inflatable bladder 96 may generally contract when fluid is extracted therefrom, for example, via the packer fluid pump 98.

As such, to facilitate securing the end section 90 of the fitting liner 70B against the pipe segment tubing 22, the inflatable bladder 96 of the packer assembly 92 may be inserted into the liner bore 72 while in a less inflated state. The packer fluid pump 98 of the packer assembly 92 may then be operated to supply (e.g., inject) fluid to the inflatable bladder 96 to facilitate transitioning the inflatable bladder 96 from the less inflated state to a more inflated state such that resulting expansion of the inflatable bladder 96 pushes the end section 90 of the fitting liner 70B outwardly in a radial direction 94 toward the inner layer 26 of the pipe segment tubing 22. In particular, to facilitate securing the fitting liner 70B against the pipe segment tubing 22, the packer assembly 92 may continue expanding its inflatable bladder 96 outwardly at least until the outer surface 78 in the end section 90 of the fitting liner 70B directly abuts the inner layer 26 of the pipe segment tubing 22.

As described above, in some embodiments, a fitting liner 70 may be implemented using a relative inelastic material, such as a ceramic metal, a polymer material (e.g., plastic), or a metal material (e.g., steel). Thus, at least in such embodiments, the end section 90 of the fitting liner 70B may remain engaged with the inner layer 26 of the pipe segment tubing 22 even after the inflatable bladder 96 is transitioned from the more inflated state to a less inflated state and withdrawn from the liner bore 72. In fact, in some such embodiments, compressing the outer surface 78 of the fitting liner 70B against the inner layer 26 of the pipe segment tubing 22 may effectively produce a fluid seal therebetween, which, at least in some instances, may obviate a discrete liner seal 86. Moreover, as depicted, the end section 90 of the fitting liner 70 covers the nose 84 of the fitting body 38, which, at least in some instance, may obviate coating the base material of the fitting body 38. In this manner, a pipe fitting 18 may be implemented with a fitting liner 70, which, at least in some instances, may facilitate improving the lifespan of the pipe fitting 18 and, thus, the lifespan of a pipeline system 10 in which the pipe fitting 18 is deployed, for example, at least in part by reducing the amount of erosion that a slurry flow produces in its fitting body 38.

Figure 8:
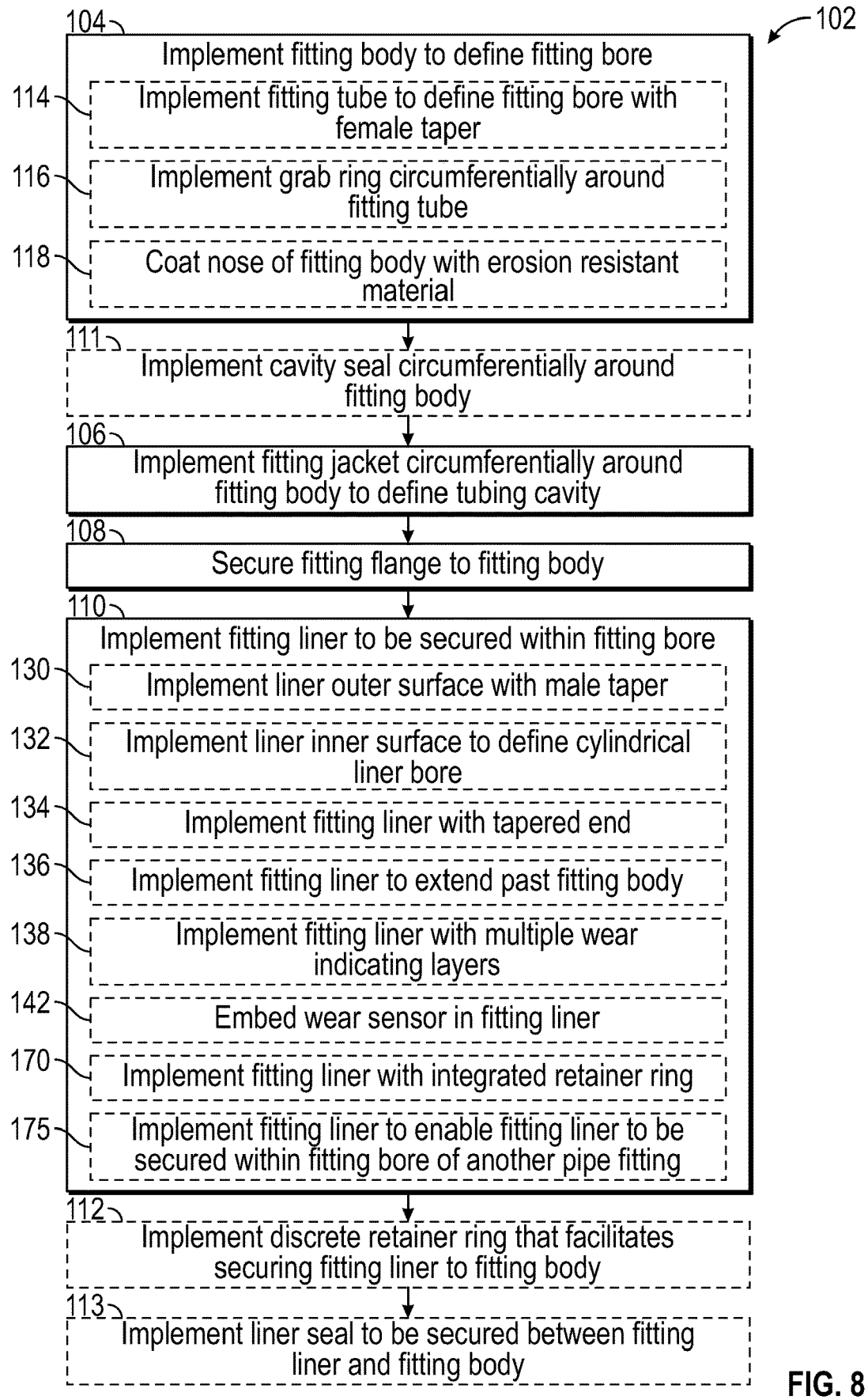
FIG. 8 is a flow diagram of an example process for implementing a pipe fitting with a fitting liner, in accordance with an embodiment of the present disclosure.

To help further illustrate, an example of a process 102 for implementing a pipe fitting 18 is described in FIG. 8. Generally the process 102 includes implementing a fitting body to define a fitting bore (process block 104) and implementing a fitting jacket circumferentially around the fitting body to define a tubing cavity (process block 106). Additionally, the process 102 generally includes implementing a flange circumferentially around the fitting body (process block 108) and implementing a fitting liner to be secured within the fitting bore (process block 110).

Although described in a specific order, which corresponds with an embodiment of the present disclosure, it should be appreciated that the example process 102 is merely intended to be illustrative and not limiting. In particular, in other embodiments, a process 102 for implementing a pipe fitting 18 may include one or more additional process blocks and/or omit one or more of the depicted process blocks. For example, some embodiments of the process 102 may additionally include implementing a cavity seal circumferentially around the fitting body (process block 111) while other embodiments of the process 102 do not. Furthermore, some embodiments of the process 102 may additionally include implementing a discrete retainer ring that facilitates securing the fitting liner within the fitting bore (process block 112) while other embodiments of the process 102 do not. Moreover, some embodiments of the process 102 may additionally include implementing a liner seal to be secured between the fitting liner and the fitting body (process block 113) while other embodiments of the process 102 do not. Additionally or alternatively, in other embodiments, one or more of the depicted process blocks may be performed in a different order, for example, such that fitting liner is implemented before the fitting body.

In any case, as described above, a pipe fitting 18 may include a fitting body 38, which is implemented to define a fitting bore 40 through the pipe fitting 18. As such, implementing the pipe fitting 18 may include implementing a fitting body 38 to define a fitting bore 40 through the pipe fitting 18 (process block 104). In particular, in some embodiments, the fitting body 38 may be implemented at least in part using metal, such as carbon steel, stainless steel, duplex stainless steel, and/or super duplex stainless steel.

Additionally, as described above, in some embodiments, the fitting body 38 of a pipe fitting 18 may include a fitting tube 42, which is implemented to define the fitting bore 40 with a female taper 69, and a grab ring 44, which is implemented circumferentially around the fitting tube 42 to facilitate securing a swage machine, which is to be used to facilitate securing the pipe fitting 18 to pipe segment tubing 22, to the pipe fitting 18. Thus, in such embodiments, implementing the fitting body 38 of the pipe fitting 18 may include implementing a fitting tube 42 to define the fitting bore 40 of the pipe fitting 18 with a female taper 69 (process block 114). Furthermore, in such embodiments, implementing the fitting body 38 of the pipe fitting 18 may include implementing a grab ring 44 circumferentially around the fitting tube 42, for example, such that the grab ring 44 includes a grab notch 46 that is implemented (e.g., sized and/or shaped) to matingly interlock with a grab tab on a grab plate of the swage machine to facilitate securing the swage machine to the pipe fitting 18 (process block 116).

Furthermore, as described above, in some embodiments, implementing the fitting body 38 of a pipe fitting 18 to define its fitting bore 40 with a female taper 69 may facilitate securing (e.g., anchoring) a fitting liner 70 in the pipe fitting 18, for example, at least in part by enabling a male taper 80 implemented along the outer surface 78 of the fitting liner 70 to push against the female taper 69 when force is exerted on the fitting liner 70 in an axial direction 82 from the male taper 80 toward the female taper 69. However, as described above, even after the fitting liner 70 has been secured in the pipe fitting 18, in some embodiments, the nose 84 of the fitting body 38 may nevertheless remain exposed to a slurry 60 flowing through the pipe fitting 18. Thus, to facilitate improving lifespan of the fitting body 38, in some such embodiments, the nose 84 of the fitting body 38 may be coated with material that is less susceptible to erosion due to the slurry 60 as compared a base material that is used to implement the fitting body 38 (process block 118). For example, the base material of the fitting body 38 may be steel while the coating material disposed on its nose 84 is tungsten carbide and/or chromium.

Moreover, as described above, a pipe segment 20 may be secured to a pipe fitting 18 at least in part by securing and sealing the tubing 22 of the pipe segment 20 around the fitting body 38 (e.g., fitting tube 42) of the pipe fitting 18. To facilitate sealing pipe segment tubing 22 around its fitting body 38, as described above, in some embodiments, the pipe fitting 18 may additionally include a cavity seal 52, which is implemented circumferentially around the fitting body 38 to enable the cavity seal 52 to be compressed between the fitting body 38 and the inner layer 26 of the pipe segment tubing 22. Thus, in such embodiments, implementing the pipe fitting 18 may include implementing a cavity seal 52 circumferentially around its fitting body 38 (process block 111). For example, in some such embodiments, the cavity seal 52 may be an O-ring seal or a belt seal that is implemented at least in part using elastic material, such as plastic.

Additionally, as described above, a pipe fitting 18 may be secured to a pipe segment 20 using swaging techniques at least in part by conformally deforming a fitting jacket 48 of the pipe fitting 18 around the tubing 22 of the pipe segment 20. In particular, as described above, the fitting jacket 48 may be implemented circumferentially around the fitting body 38 to define a tubing cavity 50 in which the pipe segment tubing 22 is to be secured and sealed. As such, implementing the pipe fitting 18 may include implementing a fitting jacket 48 circumferentially around its fitting body 38 to define a tubing cavity 50 in which pipe segment tubing 22 is to be secured and sealed (process block 106). In addition to a pipe segment 20, as described above, a pipe fitting 18 may be secured to another pipeline component, such as a bore fluid source 12, a bore fluid destination 14, or another pipe fitting 18.

Figure 9:
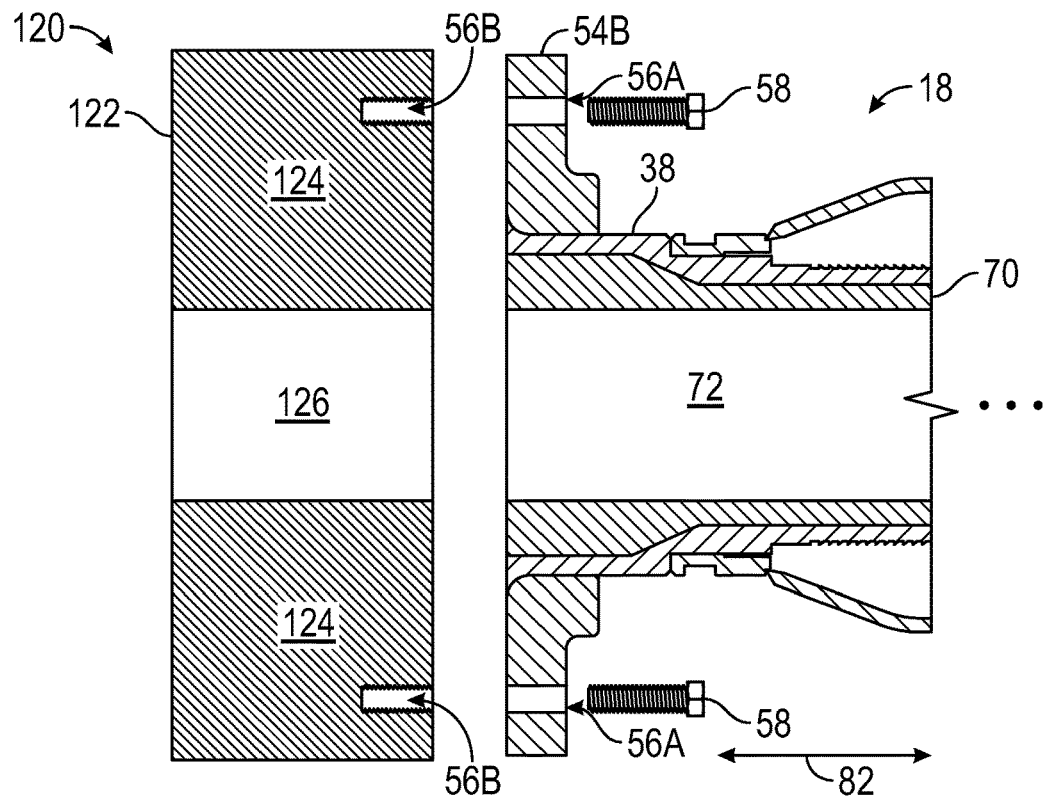
FIG. 9 is an axial cross-section profile of an example of another portion of the pipeline system of FIG. 1 that includes a pipe fitting with a fitting liner and another pipeline component, in accordance with an embodiment of the present disclosure.

To help illustrate, an example of a portion 120 of a pipeline system 10, which includes a portion of a pipe fitting 18 with a fitting liner 70 and another pipeline component 122, is shown in FIG. 9. As depicted, the other pipeline component 122 includes solid material 124 that is implemented to define a pipeline bore 126, which is to be fluidly coupled to the liner bore 72 defined by the fitting liner 70. Additionally, as depicted, when the pipe fitting 18 is secured to the other pipeline component 122, the fitting liner 70 will directly abut the solid material 124 of the other pipeline component 122 in an axial direction 82, which, at least in some instances, may facilitate securing (e.g., anchoring) the fitting liner 70 in the pipe fitting 18, for example, instead of being pushed into the other pipeline component 122. In fact, in some embodiments, the solid material 124 of the other pipeline component 122 may include a fitting liner 70 of another pipe fitting 18.

Figure 10:
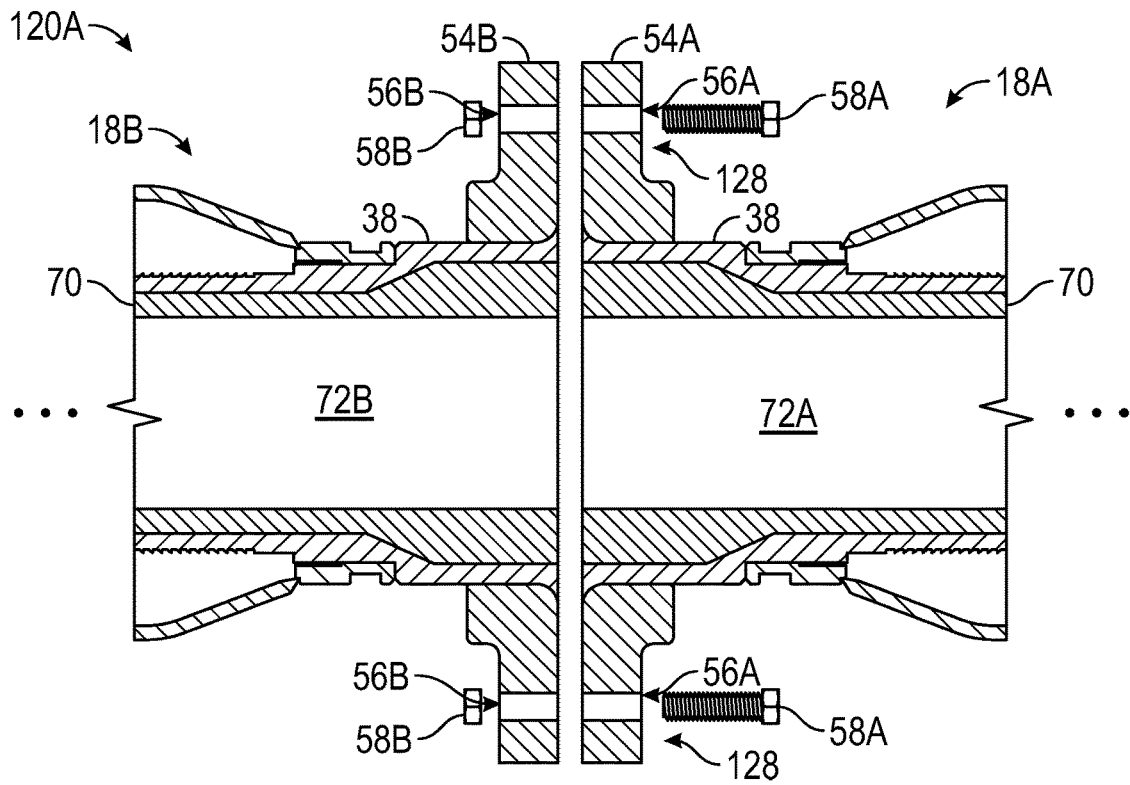
FIG. 10 is an axial cross-section profile of an example of the portion of the pipeline system of FIG. 9, which includes multiple pipe fittings that each have a separate fitting liner, in accordance with an embodiment of the present disclosure.

To help illustrate, an example of a portion 120A of a pipeline system 10, which includes a portion of a first pipe fitting 18A and a portion of a second pipe fitting 18B, is shown in FIG. 10. In particular, as depicted, the first pipe fitting 18A includes a fitting liner 70, which is implemented to define a first liner bore 72A, and the second pipe fitting 18B includes a fitting liner 70, which is implemented to define a second liner bore 72B. Additionally, to facilitate securing the pipe fittings 18 to one another, as depicted, the first pipe fitting 18A includes first threaded fasteners 58A—namely bolts—and the second pipe fitting 18B includes second threaded fasteners 58B—namely nuts.

Furthermore, as depicted, the first pipe fitting 18A includes a first flange 54A, which is implemented circumferentially around its fitting body 38, and the second pipe fitting 18B includes a second flange 54B, which is implemented circumferentially around its fitting body 38. In particular, as depicted, the first flange 54A of the first pipe fitting 18A includes first fastener openings 56A, which are implemented to be aligned with second fastener openings 56B in the second flange 54B of the second pipe fitting 18B. As such, in some embodiments, the pipe fittings 18 may be secured to one another at least in part by aligning the first fastener openings 56A in the first flange 54A of the first pipe fitting 18A with the second fastener openings 56B in the second flange 54B of the second pipe fitting 18B, inserting threaded ends 128 of the first threaded fasteners 58A through the first fastener openings 56A as well as the second fastener openings 56B, and tightening the second threaded fasteners 58B on the threaded ends 128 of the first threaded fasteners 58A.

Similarly, as depicted in FIG. 9, the pipe fitting 18 includes threaded fasteners 58 and a flange 54B, which is implemented circumferentially around its fitting body 38. In particular, as depicted, the flange 54 of the pipe fitting 18 includes first fastener openings 56A, which are implemented to be aligned with second fastener openings 56B implemented in the solid material 124 of the other pipeline component 122. As such, the pipe fitting 18 may be secured to the other pipeline component 122 at least in part by aligning the first fastener openings 56A in the flange 54 of the pipe fitting 18 with the second fastener openings 56B of the other pipeline component and securing the threaded fasteners 58 in the first fastener openings 56A of the pipe fitting 18 as well as the second fastener openings 56B of the other pipeline component 122.

Accordingly, returning to the process 102 of FIG. 8, to facilitate securing a pipe segment 20 as well as another pipeline component 122 thereto, implementing the pipe fitting 18 may include securing a flange 54 to its fitting body 38 (process block 108). In particular, as described above, in some embodiments, the flange 54 may be secured circumferentially around the fitting body 38 of the pipe fitting 18. However, in other embodiments, the flange 54 may be secured to the fitting body 38 such that the flange 54 effectively extends the fitting body 38 in an axial direction 82, for example, when the flange 54 is welded to a weld neck of the fitting body 38. Additionally, as described above, to facilitate securing a pipe fitting 18 to another pipeline component 122, in some embodiments, the flange 54 of the pipe fitting 18 may be implemented with one or more fastener openings 56, which are each implemented to enable a corresponding threaded fastener 58, such as a bolt, to be inserted and secured therein. However, in other embodiments, the flange 54 of the pipe fitting 18 may not include fastener openings 56, for example, when the flange 54 is a hub flange, such as a Vector Techlok® flange, a Grayloc® flange, or the like.

In any case, as described above, to facilitate improving the lifespan of a pipe fitting 18, a fitting liner 70 may be secured within the fitting bore 40 of the pipe fitting 18. As such, implementing the pipe fitting 18 may include implementing a fitting liner 70 to be secured within its fitting bore 40 (process block 110). In other words, as described above, the fitting liner 70 may be implemented to be secured in the pipe fitting 18 such that the fitting liner 70 is disposed between the fitting body 38 of the pipe fitting 18 and the fitting bore 40 defined by the fitting body 38, thereby at least partially covering an inner surface 63 of the fitting body 38 and effectively limiting the fitting bore 40 to the liner bore 72 defined by the fitting liner 70, which, at least in some instances, may facilitate reducing the likelihood and/or amount of solid particles 62 in a slurry 60 that contact and, thus, erodes the fitting body 38 of the pipe fitting 18.

Furthermore, as described above, to facilitate improving the lifespan of the fitting liner 70, in some embodiments, the fitting liner 70 may be implemented with a material that is less susceptible to erosion due to parallel slurry flows as compared to the material used to implement the fitting body 38 of the pipe fitting 18. For example, the fitting body 38 may be implemented using metal, such as steel, while the fitting liner 70 is implemented using a ceramic material and/or a polymer material, such as high-density polyethylene (HDPE). However, as will be described in more detail below, in some embodiments, the fitting liner 70 of a pipe fitting 18 may be replaceable. Thus, at least in some such embodiments, the fitting liner 70 may be implemented using the same material as the fitting body 38. For example, the fitting liner 70 and the fitting body 38 may both be implemented using metal, such as steel.

Additionally or alternatively, as described above, in some embodiments, a fitting liner 70 may be implemented at least in part using a swellable material, which swells in size in the presence of fluid that is expected to be transported via the pipe fitting 18. Merely as an illustrative and non-limiting, in a copper mining application, the fitting liner 70 may be implemented using a material that swells in the presence of sulfuric acid. In other words, while a pipeline system 10 operates to flow the fluid through the pipe fitting 18, in such embodiments, the fitting liner 70 may swell in size, for example, such that the outer surface 78 of the fitting liner 70 pushes against the inner surface 63 of the fitting body 38 to facilitate producing an interference (e.g., press and/or friction) fit therebetween.

Moreover, as described above, to facilitate securing a fitting liner 70 in a pipe fitting 18, in some embodiments, the outer surface 78 of the fitting liner 70 may be implemented with a male taper 80, for example, when the inner surface 63 of a corresponding fitting body 38 defines a fitting bore 40 with a female taper 69 (process block 130). In particular, as described above, in such embodiments, the fitting liner 70 may be implemented to enable the male taper 80 of the fitting liner 70 to directly abut the female taper 69 of the fitting body 38. As such, when force is exerted on the fitting liner 70 in an axial direction 82 from the male taper 80 toward the female taper 69 (e.g., due to a slurry flow), the male taper 80 of the fitting liner 70 may push against the female taper 69 of the fitting body 38 and, thus, facilitate reducing the likelihood that the fitting liner 70 is inadvertently pushed out of the pipe fitting 18.

Furthermore, as described above, to facilitate reducing the presence of non-parallel (e.g., perpendicular) slurry flows, in some embodiments, the inner surface 74 of the fitting liner 70 may be implemented to define its liner bore 72 with a cylindrical section 73 that has a substantially constant diameter (process block 132). However, as described above, in some such embodiments, the fitting liner 70 may nevertheless be implemented with a tapered (e.g., beveled) end 76 (process block 134). In other words, in such embodiments, the inner surface 74 of the fitting liner 70 may be implemented to define the liner bore 72 such that the liner bore 72 includes a cylindrical section 73 as well as a coned section 75, which corresponds with the tapered end 76 of the fitting liner 70.

Additionally or alternatively, as described above, in some embodiments, the fitting liner 70 of a pipe fitting 18 may be implemented to extend past (e.g., beyond) the fitting body 38 of the pipe fitting 18 in an axial direction 82, for example, to facilitate covering and, thus, blocking the nose 84 of the fitting body 38 from a slurry flow (process block 136). In particular, as described above, in such embodiments, the fitting liner 70 may include a body section 88, which is implemented to be secured against the inner surface 63 of the fitting body 38, and an end section 90, which is implemented to be secured against the inner layer 26 of pipe segment tubing 22 that is secured to the pipe fitting 18. Furthermore, as described above, in some such embodiments, the end section 90 of the fitting liner 70 may be secured against the pipe segment tubing 22 at least in part by operating a packer assembly 92 to expand the end section 90 outwardly in a radial direction 94 toward the inner layer 26 of the pipe segment tubing 22.

Moreover, as briefly mentioned above, in some embodiments, a fitting liner 70 secured within a pipe fitting 18 may be replaceable. In particular, as will be described in more detail below, in some embodiments, a fitting liner 70 may be replaced with a different (e.g., new) fitting liner 70 based at least in part on associated erosion states, for example, which are each indicative of the remaining thickness of a corresponding fitting liner 70. To facilitate determining its erosion state, in some embodiments, a fitting liner 70 may be implemented with multiple wear indicating layers (process block 138).

Figure 11:
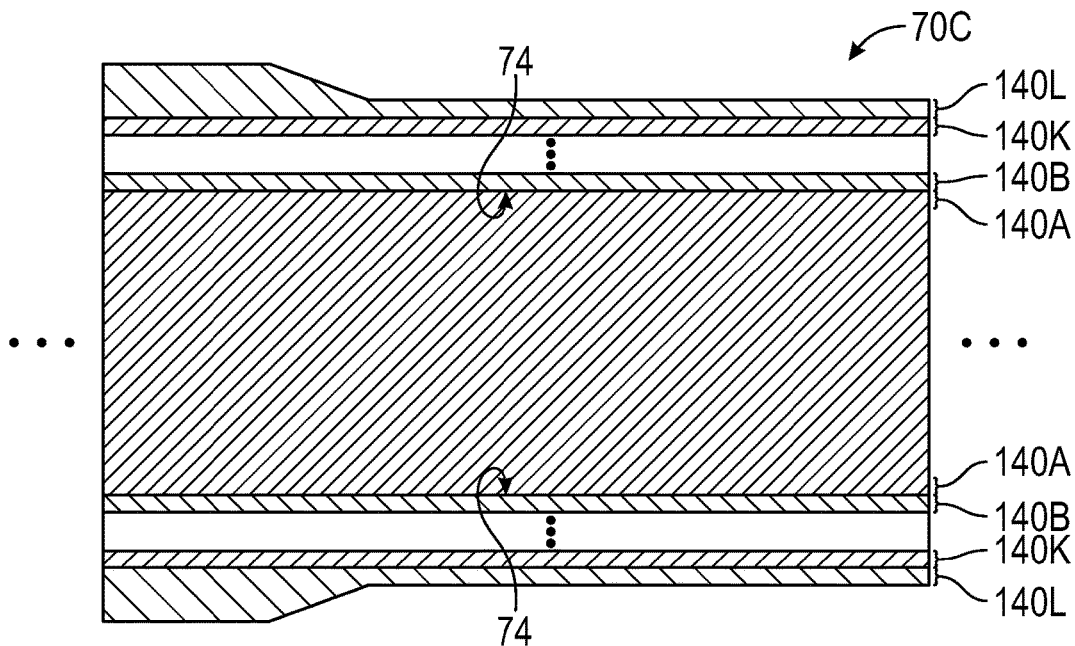
FIG. 11 is an axial cross-section profile of an example of a fitting liner that includes multiple wear indicating layers, in accordance with an embodiment of the present disclosure.

To help illustrate, an example of a portion of a fitting liner 70C, which includes multiple wear indicating layers 140, is shown in FIG. 11. In particular, as depicted, the fitting liner 70C includes a first wear indicating layer 140A and a second wear indicating layer 140B, which is implemented around the first wear indicating layer 140A. Additionally, as depicted, the fitting liner 70C includes an L-1th wear indicating layer 140K and an Lth wear indicating layer 140L, which is implemented around the L-1th wear indicating layer 140K.

However, it should be appreciated that the depicted example is merely intended to be illustrative and not limiting. In particular, in other embodiments, a fitting liner 70 may include more than four (e.g., five, six, or more) wear indicating layers 140. Alternatively, in other embodiments, a fitting liner 70 may include fewer than four (e.g., two or three) wear indicating layers 140.

In any case, as depicted, each of the wear indicating layers 140 is implemented with a different pattern and/or a different color. In other words, as solid material of the fitting liner 70 is eroded away (e.g., by a slurry flow), the pattern and/or the color that is exposed on its inner surface 74 may gradually change. Thus, in some embodiments, a user (e.g., operator), such as a service technician, may determine the remaining thickness and, thus, the erosion state of the fitting liner 70 merely by visually examining (e.g., analyzing) the color and/or pattern of its inner surface 74, for example, after a corresponding pipe fitting 18 is disconnected from another pipeline component 122.

However, returning to the process 102 of FIG. 8, to facilitate determining the erosion state of a fitting liner 70, in some embodiments, one or more wear sensors may additionally or alternatively be embedded within the fitting liner 70 (process block 142). In particular, in some such embodiments, a wear sensor embedded within the fitting liner 70 may be implemented and/or operated to determine sensor data that is indicative of the remaining thickness of the fitting liner 70. Additionally, in some such embodiments, the wear sensor may be communicatively coupled to a control sub-system, for example, to enable the control sub-system to determine the erosion state of the fitting liner 70 at least in part by analyzing (e.g., processing) the sensor data determined by the wear sensor.

Figure 12:
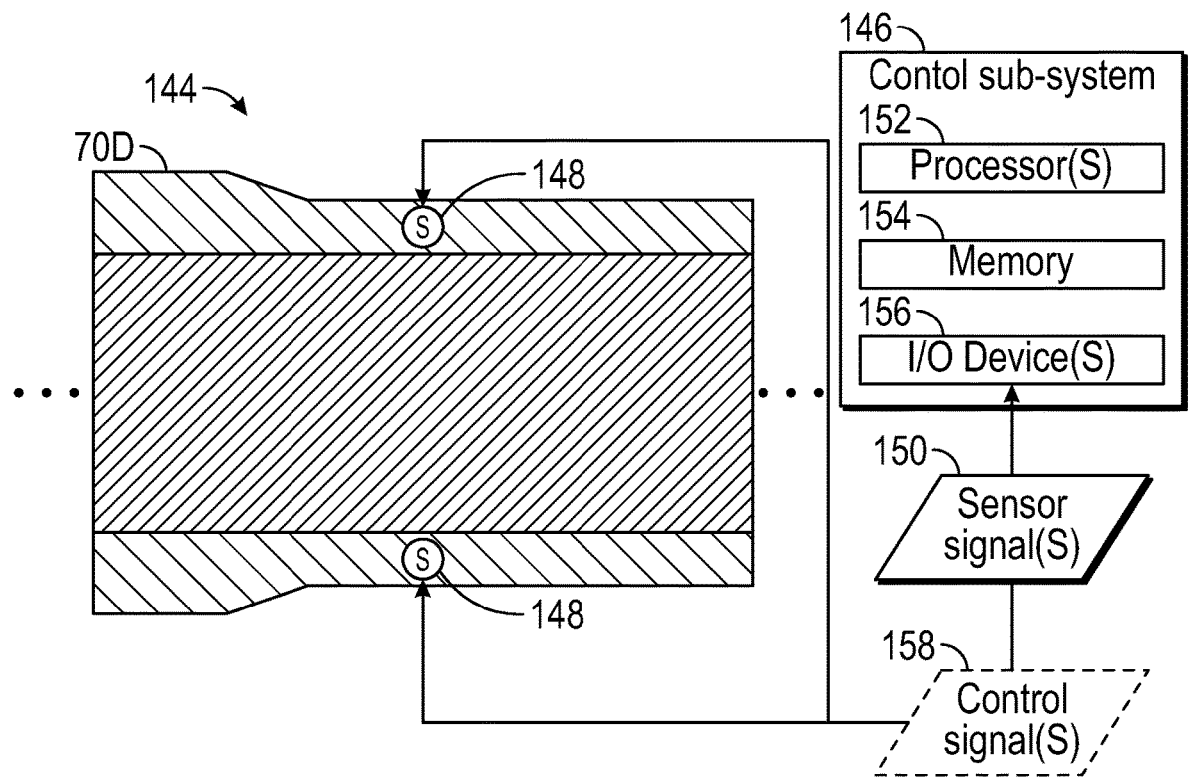
FIG. 12 is an axial cross-section profile of an example of a portion of the pipeline system 10 of FIG. 1 that includes a control sub-system and a fitting liner, which includes embedded wear sensors that are communicatively coupled to the control sub-system, in accordance with an embodiment of the present disclosure.

To help illustrate, an example of a portion 144 of a pipeline system 10, which includes a portion of a fitting liner 70D and a control sub-system 146, is shown in FIG. 12. In particular, as depicted, wear sensors 148 are embedded within the fitting liner 70D. In some embodiments, a wear sensor 148 embedded within a fitting liner 70 may include a pair of electrical wires embedded within the material of the fitting liner 70 such that, as material of the fitting liner 70 is worn (e.g., eroded) away, an electrical connection can be made between the pair of electrical wires, thereby providing an indication of how much of the fitting liner 70 has been worn away and, thus, how much of the fitting liner 70 is remaining. In any case, as depicted, each wear sensor 148 is communicatively coupled to the control sub-system 146 to enable the wear sensors 148 to transmit sensor data indicative of the remaining thickness of the fitting liner 70 to the control sub-system 146 via one or more sensor (e.g., electrical and/or optical) signals 150, for example, which are communicated via a wired connection and/or a wireless connection. In other words, in some embodiments, the control sub-system 146 may determine the sensor data and, thus, the erosion state of the fitting liner 70D based at least in part on one or more sensor signals 150 received from the wear sensors 148.

To facilitate determining the erosion state of the fitting liner 70D, as in the depicted example, in some embodiments, the control sub-system 146 may include one or more processors 152, memory 154, and one or more input/output (I/O) devices 156. In some embodiments, the memory 154 in the control sub-system 146 may include one or more tangible, non-transitory, computer-readable media that are implemented and/or operated to store data and/or executable instructions. For example, the memory 154 may store sensor data based at least in part on one or more sensor signals 150 received from a wear sensor 148. As such, in some embodiments, the memory 154 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 152 of the control sub-system 146 may include processing circuitry that is implemented and/or operated to process data and/or execute instructions stored in memory 154. In other words, in some such embodiments, a processor 152 in the control sub-system 146 may include one or more general purpose microprocessors, one or more application specific integrated circuits (ASICs), one or more field programmable gate arrays (FPGAs), or any combination thereof. For example, the processor 152 may execute instructions stored in memory 154 to determine a control signal 158 that instructs a wear sensor 148 to return a sensor signal 150 indicative of sensor data determined (e.g., sensed and/or measured) by the wear sensor 148. Additionally or alternatively, the processor 152 may process sensor data stored in memory 154 to determine the erosion state of the fitting liner 70D.

To enable communication outside of the control sub-system 146, in some embodiments, the one or more I/O devices 156 of the control sub-system 146 may include one or more input/output (I/O) ports. Additionally, to enable user interaction with the control sub-system 146, in some embodiments, the I/O devices 156 in the control sub-system 146 may include one or more user input devices and/or one or more user output devices. For example, the one or more user input devices in the control sub-system 146 may include a hard button, a soft button, a keyboard, a mouse, and/or the like. Additionally or alternatively, the one or more user output devices in the control sub-system 146 may include an electronic display, for example, which is implemented and/or operated to display a graphical user interface (GUI) that provides a visual representation of the erosion state of the fitting liner 70D.

In any case, as described above, in some embodiments, multiple (e.g., two) pipe fittings 18 implemented in accordance with the techniques described in the present disclosure may be secured back-to-back (e.g., flange-to-flange), for example, to effectively implement a midline pipe fitting 18. In particular, as described above, in some such embodiments, each of the pipe fittings 18 may include its own fitting liner 70. However, in some instances of such embodiments, securing the flanges 54 of the pipe fitting 18 directly to one another may produce a point of discontinuity at the junction between the fitting liners 70, for example, which potentially enables a slurry 60 to flow between and, thus, push the fitting liner 70 of a pipe fitting 18 away from the fitting body 38 of the pipe fitting 18. As such, to facilitate maintaining a fitting liner 70 secured against its fitting body, returning to the process 102 of FIG. 8, in some embodiments, implementing the pipe fitting 18 may include implementing a discrete retainer ring (process block 112).

Figure 13:
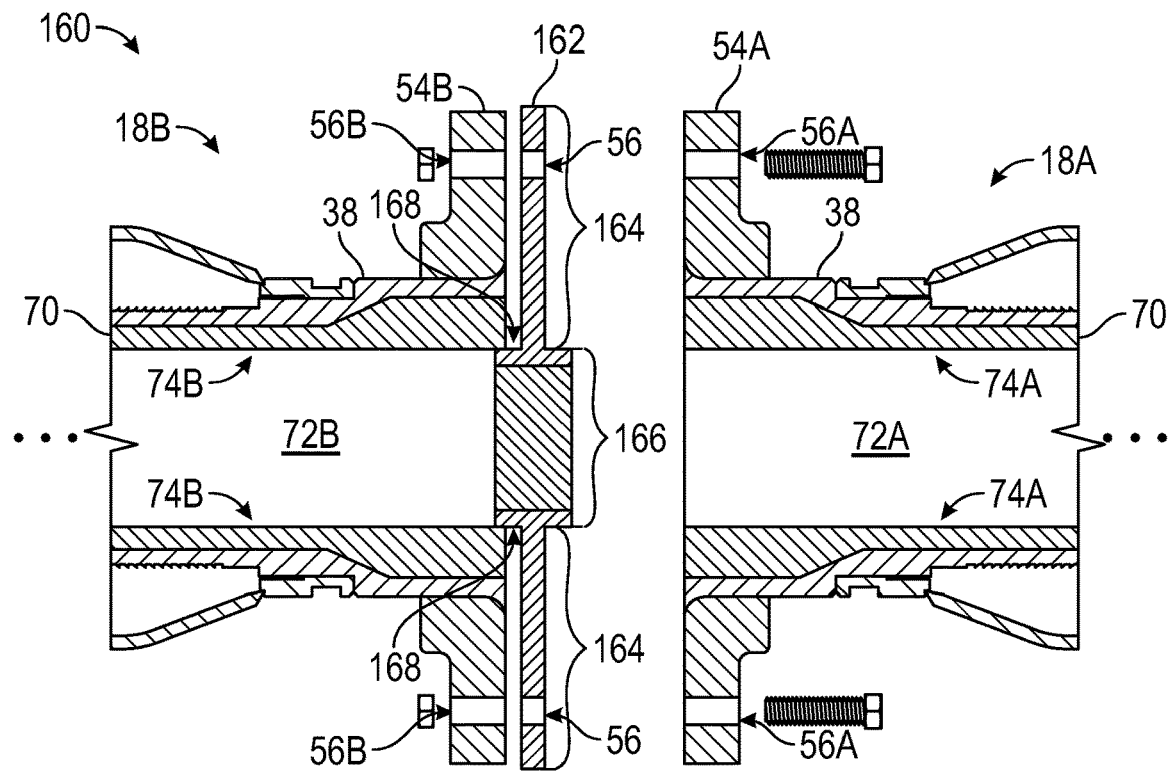
FIG. 13 is an axial cross-section profile of another example of a portion of the pipeline system of FIG. 1, which includes a discrete retainer ring and multiple pipe fittings that each have a separate fitting liner, in accordance with an embodiment of the present disclosure.

To help illustrate, an example of a portion 160 of a pipeline system 10, which includes a portion of a first pipe fitting 18A, a portion of a second pipe fitting 18B, and a discrete retainer ring 162, is shown in FIG. 13. As depicted, the discrete retainer ring 162 includes a flange section 164, which is implemented to be secured between a first flange 54A of the first pipe fitting 18A and a second flange 54B of the second pipe fitting 18B. In particular, as depicted, the flange section 164 of the discrete retainer ring 162 includes fastener openings 56, which are implemented to be aligned with first fastener openings 56A in the first flange 54A of the first pipe fitting 18A as well as second fastener openings 56B in the second flange 54B of the second pipe fitting 18B.

In addition to the flange section 164, as depicted, the discrete retainer ring 162 includes a bore section 166 that is implemented to be secured within a first liner bore 72A, which is defined by the fitting liner 70 of the first pipe fitting 18A, as well as a second liner bore 72B, which is defined by the fitting liner 70 of the second pipe fitting 18B. In particular, as in the depicted example, an outer surface 168 of the bore section 166 of the discrete retainer ring 162 may be implemented to directly abut the first inner surface 74A of the fitting liner 70 of the first pipe fitting 18A as well as the second inner surface 74B of the fitting liner 70 of the second pipe fitting 18B. As such, when the discrete retainer ring 162 is secured between the first pipe fitting 18A and the second pipe fitting 18B, the bore section 166 of the discrete retainer ring 162 may facilitate maintaining the fitting liners 70 of the pipe fittings 18 secured against corresponding fitting bodies 38.

However, it should be appreciated that the depicted example is merely intended to be illustrative and not limiting. In particular, to facilitate reducing component count and, thus, implementation associated cost of a pipe fitting 18, in other embodiments, a retainer ring may be integrated with a fitting liner 70 that is or is to be secured in the pipe fitting 18. In other words, returning to the process 102 of FIG. 8, in such embodiments, implementing the fitting liner 70 to be secured within the fitting bore 40 of the pipe fitting 18 may include implementing the fitting liner 70 with an integrated retainer ring (process block 170)

Figure 14:
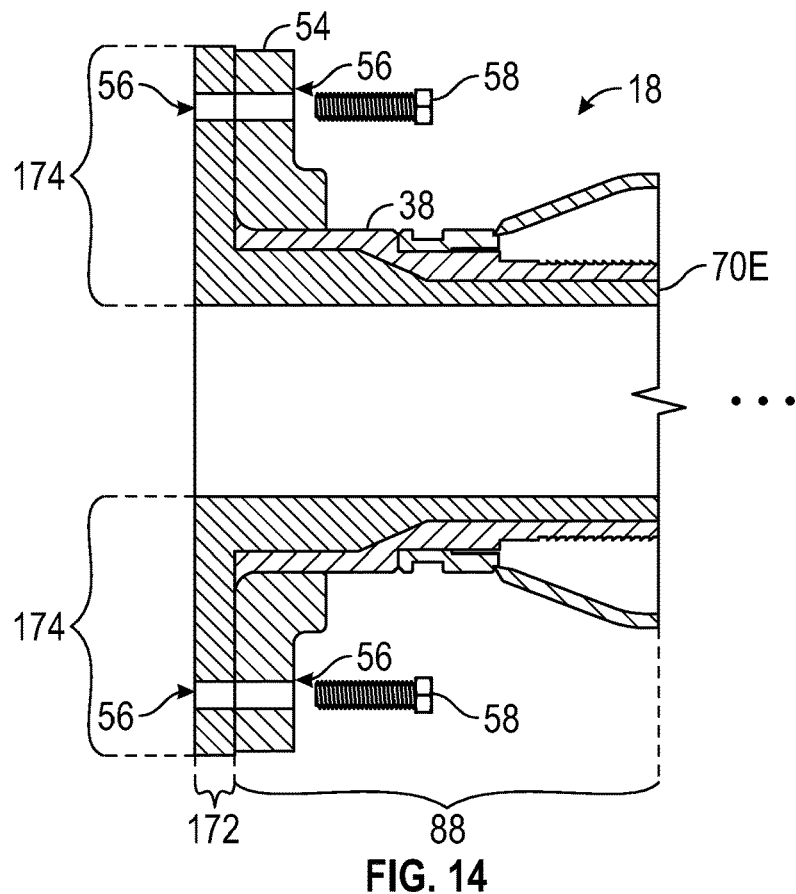
FIG. 14 is an axial cross-section profile of another example of a portion of the pipeline system of FIG. 1, which includes a pipe fitting with a fitting liner that includes an integrated retainer ring, in accordance with an embodiment of the present disclosure.

To help illustrate, an example of a portion of a pipe fitting 18, which includes a fitting liner 70E with an integrated retainer ring 172, is shown in FIG. 14. As depicted, the fitting liner 70E includes a body section 88, which is implemented to directly abut the fitting body 38 of the pipe fitting 18. In addition to the body section 88, as depicted, the fitting liner 70E includes a flange section 174, which corresponds with the integrated retainer ring 172, for example, in addition to an end section 90 that is implemented to be secured against the inner layer 26 of pipe segment tubing 22.

Furthermore, to facilitate securing the fitting liner 70E in the pipe fitting 18, as depicted, the flange section 174 of the fitting liner 70E includes fastener openings 56. In particular, in some embodiments, the fastener openings 56 in the flange section 174 of the fitting liner 70E may be implemented to align with the fastener openings 56 implemented in the flange 54 of the pipe fitting 18. Accordingly, in such embodiments, the fitting liner 70E may be secured to the pipe fitting 18 at least in part by inserting and securing threaded fasteners 58 in the fastener openings 56 in the flange 54 as well the fastener openings 56 in the flange section 174 of the fitting liner 70E.

In any case, as described above, in some embodiments, multiple (e.g., two) pipe fittings 18 implemented in accordance with the techniques described in the present disclosure may be secured back-to-back (e.g., flange-to-flange), for example, to effectively implement a midline pipe fitting 18. As described above, in some such embodiments, each of the pipe fittings 18 may include its own fitting liner 70. However, in other embodiments, the pipe fittings 18 may share a fitting liner 70, which, at least in some instances, may facilitate reducing component count and, thus, implementation associated cost of a pipeline system 10 in which the pipe fittings 18 are deployed. In other words, returning to the process 102 of FIG. 8, in such embodiments, implementing the fitting liner 70 may include implementing the fitting liner 70 to enable the fitting liner 70 to be secured in the fitting bore 40 of the pipe fitting 18 as well as another fitting bore 40 of another pipe fitting 18 (process block 175).

Figure 15:
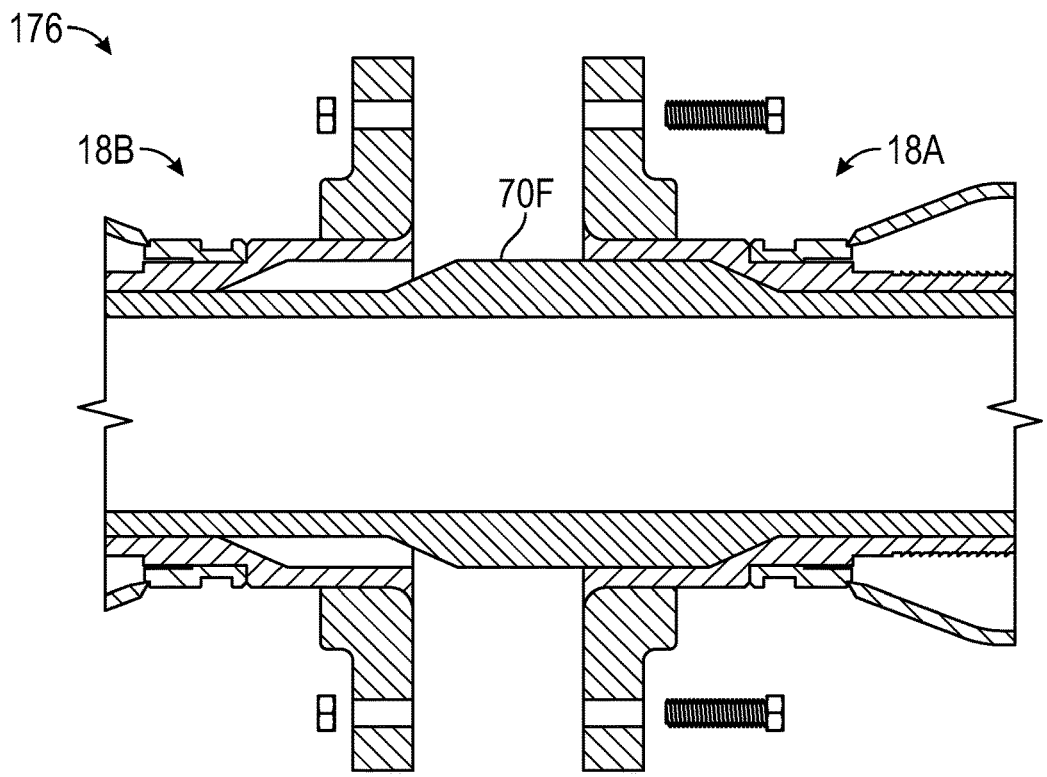
FIG. 15 is an axial cross-section profile of another example of a portion of the pipeline system of FIG. 1, which includes multiple pipe fittings that share a fitting liner, in accordance with an embodiment of the present disclosure.
Figure 16:
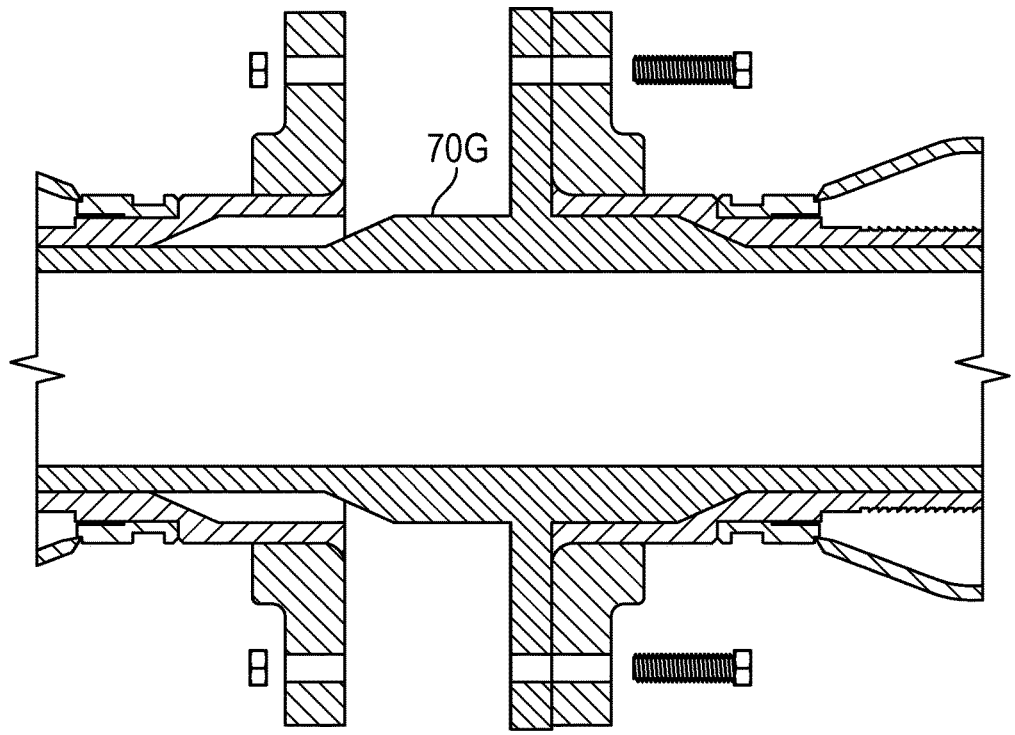
FIG. 16 is an axial cross-section profile of another example of a portion of the pipeline system of FIG. 1 that includes multiple pipe fittings, which share a fitting liner that includes an integrated retainer ring, in accordance with an embodiment of the present disclosure.

To help illustrate, an example of a portion 176 of a pipeline system 10, which includes a portion of a first pipe fitting 18A and a portion of a second pipe fitting 18B, is shown in FIG. 15. In particular, instead of the first pipe fitting 18A and the second pipe fitting 18B each including its own fitting liner 70, as depicted, the pipe fittings 18 are implemented to share a fitting liner 70F, which, at least in some instances, may facilitate reducing component count and, thus, implementation associated cost of the pipeline system 10 in which the pipe fittings 18 are or are to be deployed. However, it should be appreciated that the depicted example is merely intended to be illustrative and not limiting. For example, as depicted in FIG. 16, in other embodiments, a fitting liner 70G, which is implemented to be shared by multiple pipe fittings 18, may also include an integrated retainer ring 172.

In any case, as described above, to facilitate maintaining a fitting liner 70 secured against the fitting body 38 of a pipe fitting 18, in some embodiments, the pipe fitting 18 may additionally include a liner seal 86, which is implemented to be secured between the inner surface 63 of the fitting body 38 and the outer surface 78 of the fitting liner 70. Thus, returning to the process 102 of FIG. 8, in such embodiments, implementing the pipe fitting 18 may include implementing a liner seal 86 that is to be secured between the fitting liner 70 and the fitting body 38 (process block 113). In particular, to facilitate securing the liner seal 86 between the fitting liner 70 and the fitting body 38, in some such embodiments, the liner seal 86 may be implemented circumferentially around the fitting liner 70. Additionally or alternatively, in some such embodiments, the liner seal 86 may be an O-ring seal or a belt seal that is implemented at least in part using elastic material, such as plastic. In this manner, a pipe fitting 18 may be implemented to enable the pipe fitting 18 to be deployed in a pipeline system 10 such that the pipe fitting 18 facilitates improving the lifespan of the pipeline system 10.

Figure 17:
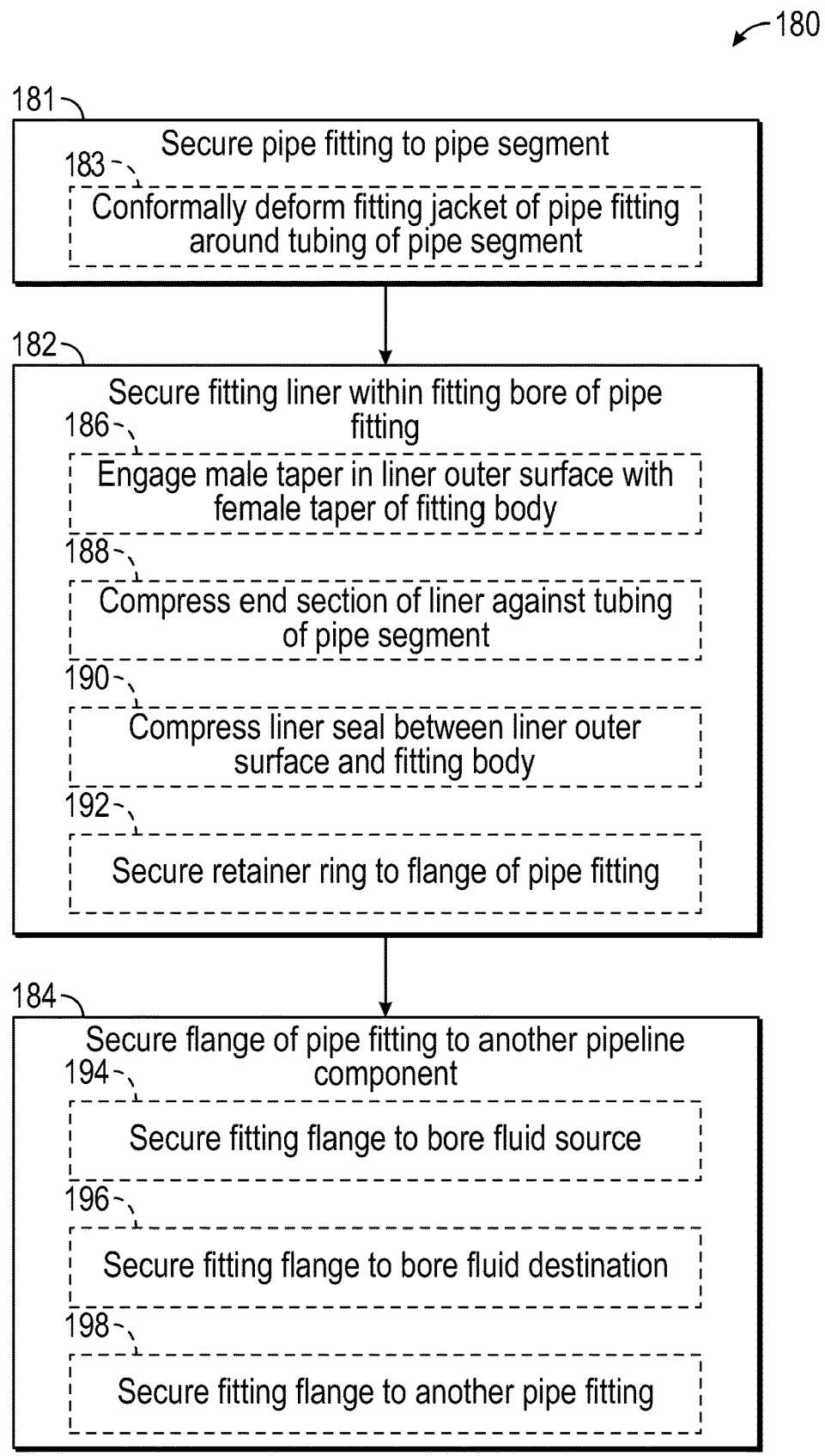
FIG. 17 is a flow diagram of an example of a process for deploying a pipe fitting with a fitting liner in a pipeline system, in accordance with an embodiment of the present disclosure.

To help further illustrate, an example of a process 180 for deploying a pipe fitting 18 in a pipeline system 10 is described in FIG. 17. Generally, the process 180 includes securing a pipe fitting to a pipe segment (process block 181) and securing a fitting liner within a fitting bore of the pipe fitting (process block 182). Additionally, the process 180 generally includes securing a flange of the pipe fitting to another pipeline component (process block 184).

Although described in a specific order, which corresponds with an embodiment of the present disclosure, it should be appreciated that the example process 180 is merely intended to be illustrative and not limiting. In particular, in other embodiments, a process 180 for deploying a pipe fitting 18 in a pipeline system 10 may include one or more additional process blocks and/or omit one or more of the depicted process blocks. Additionally or alternatively, in other embodiments, one or more of the depicted process blocks may be performed in a different order, for example, such that the fitting liner 70 is secured in the fitting bore 40 of the pipe fitting 18 before the pipe fitting 18 is secured to the pipe segment 20.

In any case, as described above, in a pipeline system 10, a pipe fitting 18 may be secured to a pipe segment 20. As such, deploying the pipe fitting 18 in a pipeline system 10 may include securing the pipe fitting 18 to a pipe segment 20 (process block 181). In particular, as described above, in some embodiments, a pipe fitting 18 may include a fitting jacket 48, which is implemented circumferentially around its fitting body 38 to define a tubing cavity 50 in which the tubing 22 of a pipe segment 20 is to be secured and sealed. Thus, in such embodiments, the pipe fitting 18 may be secured to the pipe segment 20 at least in part by conformally deforming the fitting jacket 48 around pipe segment tubing 22 that is present in a corresponding tubing cavity 50, for example, using a swage machine such that an inner surface of the fitting jacket 48 engages the outer layer 28 of the pipe segment tubing 22, an outer surface of the fitting body 38 engages the inner layer 26 of the pipe segment tubing 22, and/or a cavity seal 52 is compressed between the outer surface of the fitting body 38 and the inner layer 26 of the pipe segment tubing 22 (process block 183).

Additionally, as described above, to facilitate improving the lifespan of a pipeline system 10 in which it is deployed, a pipe fitting 18 may include a fitting liner 70 secured in its fitting bore 40. As such, deploying the pipe fitting 18 in a pipeline system 10 may include securing a fitting liner 70 in the fitting bore 40 of the pipe fitting 18 (process block 182). In particular, the fitting liner 70 may be secured such that the outer surface 78 of a body section 88 of the fitting liner 70 directly abuts the inner surface 63 of the fitting body 38 of the pipe fitting 18 that defines its fitting bore 40, thereby at least partially covering an inner surface 63 of the fitting body 38 and effectively limiting the fitting bore 40 to the liner bore 72 defined by the inner surface 74 of the fitting liner 70. In other words, the body section 88 of the fitting liner 70 may be secured between the fitting body 38 and a bore through the pipe fitting 18, which, at least in some instances, may facilitate reducing the likelihood and/or amount of solid particles 62 in a slurry flow that contact the fitting body 38 and, thus, improving the lifespan of the pipe fitting 18. In fact, to facilitate further improving lifespan of the pipe fitting 18, as will be described in more detail below, in some embodiments, a fitting liner 70 may be secured in a pipe fitting 18 such that it is selectively replaceable, for example, based at least in part on the erosion state associated with the fitting liner 70.

In any case, as described above, to facilitate securing a fitting liner 70 in the fitting bore 40 of a pipe fitting 18, in some embodiments, the outer surface 78 of the fitting liner 70 may be implemented with a male taper 80, which is to be used to be used to matingly engage a female taper 69 implemented on the inner surface 63 of the fitting body 38 that defines the fitting bore 40. In other words, in such embodiments, securing the fitting liner 70 in the pipe fitting 18 may include matingly engaging the male taper 80 on the outer surface 78 of the fitting liner 70 with the female taper 69 on the inner surface 63 of the fitting body 38 (process block 186). In particular, in some such embodiments, securing the fitting liner 70 in the pipe fitting 18 may include inserting the fitting liner 70 into the fitting bore 40 from a flange-end of the pipe fitting 18 such that the male taper 80 on the outer surface 78 of the fitting liner 70 engages the female taper 69 on the inner surface 63 of the fitting body 38.

To facilitate maintaining the body section 88 of a fitting liner 70 secured against a corresponding fitting body 38 of a pipe fitting 18, as described above, in some embodiments, the fitting liner 70 may additionally include an end section 90, which is implemented to be secured against the inner layer 26 of pipe segment tubing 22 that is secured to the pipe fitting 18. In other words, in such embodiments, securing the fitting liner 70 in the pipe fitting 18 may include securing the end section 90 of the fitting liner 70 against the tubing 22 of a pipe segment 20 that is secured to the pipe fitting 18, for example, such that the end section 90 of the pipe fitting 18 covers a nose 84 of the fitting body 38 of the pipe fitting 18 (process block 188). In particular, as described above, to facilitate securing the end section 90 of the fitting liner 70 against the pipe segment tubing 22, in some such embodiments, a packer assembly 92 may be at least partially inserted into the liner bore 72 of the fitting liner 70 and operated to expand the end section 90 of the fitting liner 70 outwardly in a radial direction 94 toward the inner layer 26 of the pipe segment tubing 22.

Additionally or alternatively, as described above, to facilitate maintaining the body section 88 of a fitting liner 70 secured against its fitting body 38, a pipe fitting 18 may include a liner seal 86. In particular, as described above, in some such embodiments, the liner seal 86 may be implemented to be compressed between the outer surface 78 of the fitting liner 70 and the inner surface 63 of the fitting body 38. In other words, in such embodiments, securing the fitting liner 70 in the pipe fitting 18 may include compressing a liner seal 86 between the outer surface 78 of the fitting liner 70 and the inner surface 63 of the fitting body 38 (process block 190).

Moreover, as described above, to facilitate securing a fitting liner 70 therein, in some embodiments, a pipe fitting 18 may include a retainer ring, which is implemented to be secured to a flange 54 of the pipe fitting 18. In other words, in such embodiments, securing the fitting liner 70 in the pipe fitting 18 may include securing a retainer ring to the flange 54 of the pipe fitting 18 (process block 192). In particular, as described above, in some such embodiments, the retainer ring may be separate from the fitting liner 70 and, thus, may be a discrete retainer ring 162, which includes a bore section 166 that is implemented such that the outer surface 168 of the bore section 166 will directly abut the inner surface 74 of the fitting liner when the discrete retainer ring 162 is secured to the flange 54 of the pipe fitting 18. However, as described above, in other embodiments, the retainer ring may be integrated with the body section 88 the fitting liner 70 and, thus, may be an integrated retainer ring 172.

In any case, as described above, to facilitate securing a retainer ring to the flange 54 of a pipe fitting 18, in some embodiments, the retainer ring may include a flange section (e.g., flange section 164 or flange section 174) that includes one or more fastener openings 56, which are implemented to be aligned with corresponding fastener openings 56 in the flange 54 of the pipe fitting 18. Accordingly, in such embodiments, the retainer ring may be secured to the flange 54 at least in part by inserting and securing a threaded fastener 58 in a fastener opening 56 implemented in the flange 54 of the pipe fitting 18 as well as a corresponding fastener opening 56 implemented in the retainer ring. However, in other embodiments, a retainer ring may be secured to the flange 54 of a pipe fitting 18 using other techniques, such as a Vector Techlok® clamp, a Grayloc® clamp, or the like.

In addition to pipe segment tubing 22, as described above, a pipe fitting 18 may be secured to another pipeline component 122 via its flange 54. As such, deploying the pipe fitting 18 in the pipeline system 10 may include securing the flange 54 of the pipe fitting 18 to the other pipeline component 122 (process block 184). In particular, as described above, in some embodiments, the other pipeline component 122 may be a bore fluid source 12 and, thus, securing the flange 54 of the pipe fitting 18 to the other pipeline component 122 may include securing the pipe fitting flange 54 to the bore fluid source 12 (process block 194). Additionally, as described above, in other embodiments, the other pipeline component 122 may be a bore fluid destination 14 and, thus, securing the flange 54 of the pipe fitting 18 to the other pipeline component 122 may include securing the pipe fitting flange 54 to the bore fluid destination 14 (process block 196). Furthermore, as described above, in other embodiments, the other pipeline component 122 may be another pipe fitting 18 and, thus, securing the flange 54 of the pipe fitting 18 to the other pipeline component 122 may include securing the pipe fitting flange 54 to the other pipe fitting 18 (process block 198).

In any case, as described above, to facilitate securing the flange 54 of a pipe fitting 18 to another pipeline component 122, in some embodiments, the pipe fitting flange 54 may include one or more fastener openings 56, which are implemented to align with corresponding fastener openings 56 that are implemented in solid material 124 of the other pipeline component 122. Accordingly, in such embodiments, the pipe fitting flange 54 may be secured to the other pipeline component 122 at least in part by inserting and securing a threaded fastener 58 in a fastener opening 56 implemented in the pipe fitting flange 54 as well as a corresponding fastener opening 56 implemented in the other pipeline component. However, in other embodiments, the flange 54 of a pipe fitting 18 may be secured to another pipeline component 122 using other techniques, such as a Vector Techlok® clamp, a Grayloc® clamp, or the like.

In this manner, a pipe fitting 18 with a fitting liner 70 may be deployed in a pipeline system 10. As described above, in some embodiments, the fitting liner 70 may be implemented with material that is less susceptible to erosion due to parallel slurry flows as compared to the material used to implement the fitting body 38 of the pipe fitting 18 and at least partially cover the inner surface 63 of the fitting body 38. Accordingly, at least in such embodiments, deploying the pipe fitting 18 with the fitting liner 70 in a pipeline system 10 may facilitate improving the lifespan of the pipe fitting 18 and, thus, the lifespan of the pipeline system 10, for example, at least in part by reducing the likelihood and/or the amount of solid particles 62 in a slurry 60 that contact the fitting body 38 while flowing through the pipe fitting 18. Moreover, as briefly mentioned above, to facilitate further improving lifespan of a pipe fitting 18, in some embodiments, different fitting liners 70 may be swapped into the pipe fitting 18, for example, based at least in part on associated erosion states.

Figure 18:
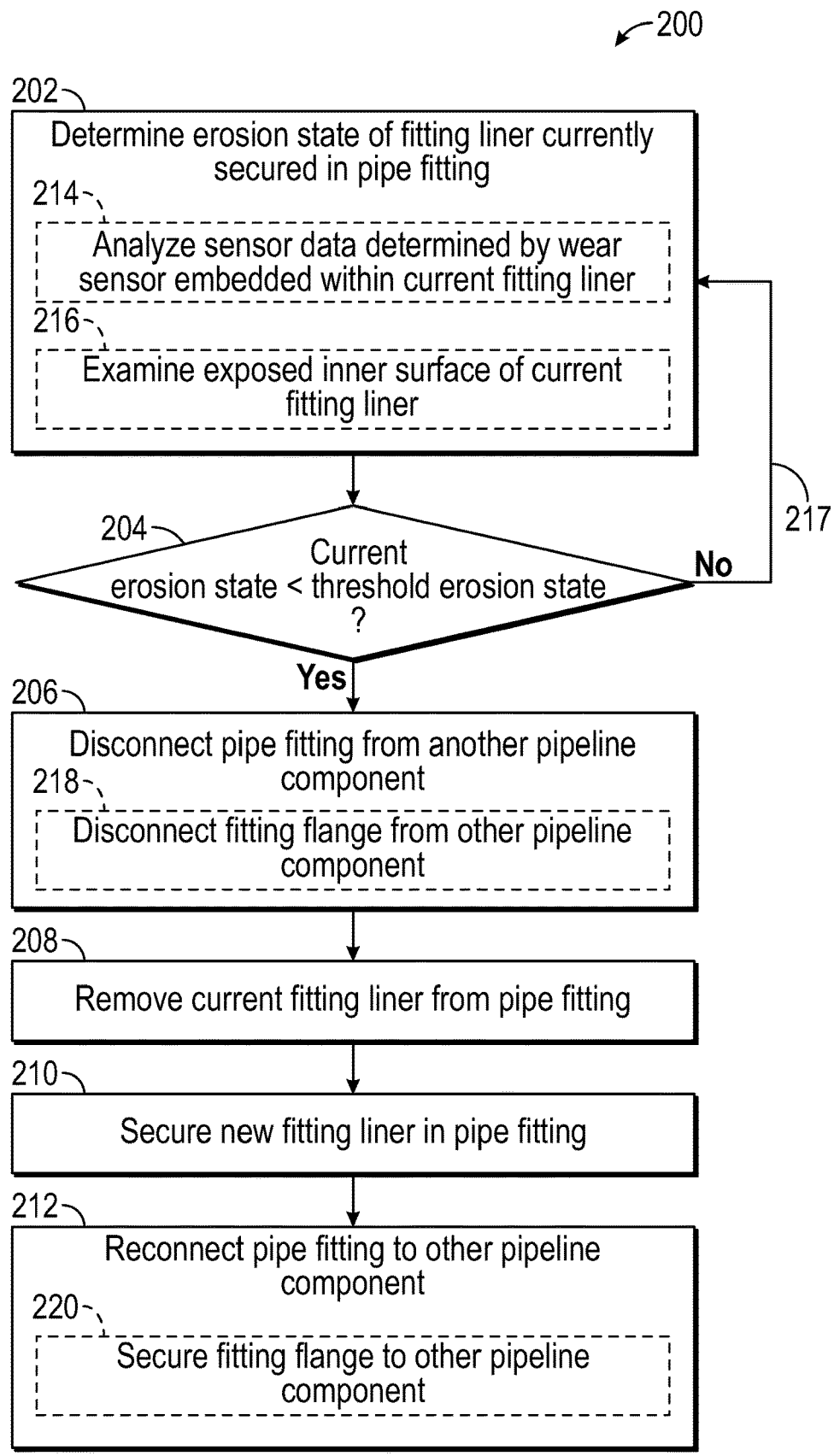
FIG. 18 is a flow diagram of an example of a process for selectively replacing a fitting liner secured in a pipe fitting, in accordance with an embodiment of the present disclosure.

To help illustrate, an example of a process 200 for selectively swapping out fitting liners 70 is described in FIG. 18. Generally, the process 200 includes determining an erosion state of a fitting liner that is currently secured in a pipe fitting (process block 202) and determining whether the current erosion state of the current fitting liner is less than a threshold erosion state (decision block 204). Additionally, when the current erosion state of the current fitting liner is less than the threshold erosion state, the process 200 generally includes disconnecting the pipe fitting from another pipeline component (process block 206), removing the current fitting liner from the pipe fitting (process block 208), securing a new fitting liner in the pipe fitting (process block 210), and reconnecting the pipe fitting to the other pipeline component (process block 212).

Although described in a specific order, which corresponds with an embodiment of the present disclosure, it should be appreciated that the example process 200 is merely intended to be illustrative and not limiting. In particular, in other embodiments, a process 200 for selectively swapping out fitting liners 70 may include one or more additional process blocks and/or omit one or more of the depicted process blocks. Additionally or alternatively, in other embodiments, one or more of the depicted process blocks may be performed in a different order, for example, such that the pipe fitting is disconnected from the other pipeline component before the erosion state of the fitting liner currently secured in the pipe fitting is determined. Moreover, in some embodiments, the process 200 may be performed at least in part by executing instructions stored in a tangible, non-transitory, computer-readable medium, such as memory 154 in a control sub-system 146, using processing circuitry, such as a processor 152 in the control sub-system 146.

For example, in some such embodiments, a control sub-system 146 of a pipeline system 10 may relatively autonomously determine the erosion state of a fitting liner 70 that is currently secured in a pipe fitting 18 deployed in the pipeline system 10. As described above, the erosion state of a fitting liner 70 may be indicative of the remaining thickness of the fitting liner 70. Additionally, as described above, in some embodiments, a wear sensor 148 embedded within a fitting liner 70 may determine sensor data indicative of the remaining thickness of the fitting liner 70. Thus, in such embodiments, the control sub-system 146 may determine the erosion state of the fitting liner 70 that is currently secured in the pipe fitting 18 at least in part by analyzing the sensor data determined by the embedded wear sensor 148 (process block 214). In fact, in some embodiments, the control sub-system 146 may display a graphical user interface (GUI), which provides a visual representation of the erosion state of the current fitting liner 70 to a user (e.g., operator), such as a service technician, via an I/O device 156, such as an electronic display.

However, in other embodiments, the erosion state of the fitting liner 70 that is currently secured in a pipe fitting 18 may be manually determined, for example, by a user (e.g., operator), such as a service technician. In particular, as described above, to facilitate manually determine the erosion state of a fitting liner 70, in some embodiments, the fitting liner 70 may include multiple wear indicating layers 140, for example, which have differing colors and/or differing patterns. Thus, in such embodiments, the erosion state of the current fitting liner 70 may be determined at least in part by visual examining the exposed color and/or the exposed pattern on the inner surface 74 of the fitting liner 70, for example, after the pipe fitting 18 has been disconnected from another pipeline component 122 deployed in the pipeline system 10 (process block 216).

To facilitate determining whether the current fitting liner 70 should be swapped out, its current erosion state may be compared against a threshold erosion state. In particular, the threshold erosion state may be indicative of a threshold liner thickness below which a corresponding fitting liner 70 should be swapped out. As such, to facilitate determining whether the current fitting liner 70 should be swapped out, the current erosion state associated with the current fitting liner 70 may be compared against the threshold erosion state to determine whether the current erosion state is less than the threshold erosion state (decision block 204).

In particular, in some embodiments, a control sub-system 146 may relatively autonomously compare the current erosion state associated with the fitting liner 70 that is currently secured in the pipe fitting 18 against the threshold erosion state. To facilitate comparing the current erosion state against the threshold erosion state, in such embodiments, the current erosion state and/or the threshold erosion state may be stored in a tangible, non-transitory, computer-readable medium, such as memory 154 in the control sub-system 146. In other embodiments, the current erosion state may be manually compared against the threshold erosion state, for example, by a user (e.g., operator), such as a service technician.

When the current erosion state is not less than the threshold erosion state, the erosion state of the fitting liner 70 that is currently secured in the pipe fitting 18 may be periodically re-determined (arrow 217). On the other hand, when the current erosion state is less than the threshold erosion state, the pipe fitting 18 may be disconnected from another pipeline component 122 to provide access to the pipe fitting 18 that enables the current fitting liner 70 to be swapped out for a new fitting liner 70 (process block 206). In particular, to facilitate improving pipeline up time, in some embodiments, the pipe fitting 18 may remain connected to the other pipeline component 122 until after it is determined that the current erosion state of the current fitting liner 70 is less than the threshold erosion state, for example, when the current erosion state is determined using embedded wear sensors 148 and/or other non-destructive testing (NDT) techniques, such as ultrasound testing techniques.

However, as described above, in other embodiments, the erosion state of the current fitting liner 70 may be determined at least in part by visually examining the exposed color and/or the exposed pattern on the inner surface 74 of the current fitting liner 70. In other words, in some such embodiments, the pipe fitting 18 may already be disconnected from the other pipeline component 122 when the erosion state of the current fitting liner 70 is compared against the threshold erosion state. In fact, to facilitate enabling the pipeline system 10 to resume operation, in such embodiments, the pipe fitting 18 with the current fitting liner 70 may be reconnected to the other pipeline component 122 when the current erosion state of the current fitting liner 70 is not less than the threshold erosion state.

In any case, as described above, to facilitate connecting a pipe fitting 18 to another pipeline component 122, in some embodiments, the pipe fitting 18 may include a flange 54, which is implemented to be secured to the other pipeline component 122. Thus, in such embodiments, disconnecting the pipe fitting 18 from the other pipeline component 122 may include disconnecting its flange 54 from the other pipeline component 122 (process block 218). In particular, as described above, in some such embodiments, the flange 54 of the pipe fitting 18 may be disconnected from the other pipeline component 122 at least in part by removing a threaded fastener 58 from a fastener opening 56 in the flange 54 and/or from a fastener opening 56 in the other pipeline component 122. Additionally or alternatively, the flange 54 of the pipe fitting 18 may be disconnected from the other pipeline component 122 at least in part by loosening a hub clamp, such as a Vector Techlok® clamp, a Grayloc® clamp, or the like, from around the flange 54 of the pipe fitting 18, for example, when the flange 54 is a hub flange, such as a Vector Techlok® flange, a Grayloc® flange, or the like.

After the pipe fitting 18 has been disconnected from the other pipeline component 122, the current (e.g., old) fitting liner 70 may be removed from the pipe fitting 18 (process block 208) and a new fitting liner 70 may be secured in the pipe fitting 18 in its place (process block 210). In particular, in some embodiments, an old fitting liner 70 that is secured in a pipe fitting 18 may be removed from the pipe fitting 18 at least in part by pulling the old fitting liner 70 out from a flange-end of the pipe fitting 18, for example, such that force exerted on the old fitting liner 70 breaks an interference (e.g., press and/or friction) fit between the outer surface 78 of the old fitting liner 70 and the inner surface 63 of the fitting body 38 of the pipe fitting 18. Additionally, in some embodiments, a new fitting liner 70 may be secured in a pipe fitting 18 in accordance with process block 182.

To enable the pipeline system 10 to resume operation, the pipe fitting 18 may then be reconnected to the other pipeline component 122 (process block 212). In particular, as described above, in some embodiments, a pipe fitting 18 may include a flange 54 that is implemented to facilitate securing the pipe fitting 18 to another pipeline component 122, such as a bore fluid source 12, a bore fluid destination, or another pipe fitting 18. Thus, in such embodiments, reconnecting the pipe fitting 18 to the other pipeline component 122 may include securing its flange 54 to the other pipeline component 122 (process block 220).

In particular, as described above, in some such embodiments, the flange 54 of the pipe fitting 18 may be connected to the other pipeline component 122 at least in part by inserting and securing a threaded fastener 58 in a fastener opening 56 in the flange 54 as well as a corresponding fastener opening 56 in the other pipeline component 122. Additionally or alternatively, the flange 54 of the pipe fitting 18 may be connected to the other pipeline component 122 at least in part by tightening a hub clamp, such as a Vector Techlok® clamp, a Grayloc® clamp, or the like, around the flange 54 of the pipe fitting 18, for example, when the flange 54 is a hub flange, such as a Vector Techlok® flange, a Grayloc® flange, or the like. In this manner, the present disclosure provides techniques for implementing and/or deploying a pipe fitting with a fitting liner, which, at least in some instances, may facilitate improving the lifespan of the pipe fitting and, thus, a pipeline system in which the pipe fitting is deployed, for example, at least in part by reducing the likelihood and/or amount of solid particles in a slurry flow that contact and, thus, erode the fitting body of the pipe fitting.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipeline system comprising:
    a pipe segment, wherein the pipe segment comprises tubing that defines a pipe bore and a fluid conduit in a tubing annulus of the tubing; and
    a pipe fitting configured to be secured to the pipe segment, wherein the pipe fitting comprises:
        a fitting body that defines a fitting bore of the pipe fitting, wherein the fitting body comprises:
            a fitting tube that defines the fitting bore of the pipe fitting; and
            a grab ring implemented circumferentially around the fitting tube;
        a fitting jacket implemented circumferentially around the fitting body to define a tubing cavity, wherein:
            the tubing of the pipe segment is configured to be inserted into the tubing cavity; and
            the fitting jacket is configured to be conformally deformed around the tubing of the pipe segment to facilitate securing the pipe fitting to the pipe segment, wherein the grab ring of the fitting body is configured to matingly interlock with a grab plate of a swage machine that operates to facilitate conformally deforming the fitting jacket of the pipe fitting around the tubing of the pipe segment;
        a fitting liner configured to be secured in the fitting bore of the pipe fitting such that a body section of the fitting liner is secured directly against an inner body surface of the fitting body to facilitate blocking a solid particle in a slurry that flows through the pipe fitting from contacting the fitting body of the pipe fitting;
        a cavity seal configured to be disposed circumferentially around the fitting body to enable the cavity seal to be compressed between an outer body surface of the fitting body and an inner layer of the pipe segment to facilitate blocking the slurry from flowing between the outer body surface of the fitting body and the inner layer of the pipe segment; and
        a liner seal configured to be disposed circumferentially around the fitting liner to enable the liner seal to be compressed between the inner body surface of the fitting body and an outer liner surface of the fitting liner to facilitate blocking the slurry from flowing between the inner body surface of the fitting body and the outer liner surface of the fitting liner.

2. The pipeline system of claim 1, wherein:
    the fitting body defines the fitting bore of the pipe fitting with a female taper; and
    the outer liner surface of the fitting liner is implemented with a male taper that is configured to matingly engage the female taper defined by the fitting body to facilitate securing the fitting liner in the fitting body of the pipe fitting.

3. The pipeline system of claim 2, wherein:
    the body section of the fitting liner comprises a tapered end; and
    the fitting liner defines a liner bore comprising:
        a cylindrical section that has a constant diameter and that radially overlaps with the male taper on the outer liner surface of the fitting liner; and
        a coned section that corresponds with the tapered end of the fitting liner.

4. The pipeline system of claim 1, wherein the fitting liner of the pipe fitting comprises an end section that is configured to extend beyond the fitting body of the pipe fitting in an axial direction, wherein the end section of the fitting liner is configured to be secured against the inner layer of the tubing of the pipe segment to facilitate blocking the solid particle in the slurry that flows through the pipe fitting from contacting the fitting body of the pipe fitting.

5. The pipeline system of claim 1, wherein:
    the pipe fitting comprises a flange configured to facilitate securing the pipe fitting to another pipeline component in the pipeline system; and the fitting liner of the pipe fitting comprises a flange section that corresponds with a retainer ring integrated with the body section of the fitting liner, wherein the flange section of the fitting liner is configured to be secured to the flange of the pipe fitting.

6. The pipeline system of claim 1, comprising a discrete retainer ring, wherein:
the pipe fitting comprises a flange configured to facilitate securing the pipe fitting to another pipeline component in the pipeline system; and
the discrete retainer ring comprises:
a flange section configured to be secured to the flange of the pipe fitting; and
a bore section configured to be disposed in a liner bore defined by the fitting liner such that an outer surface of the bore section of the discrete retainer ring directly abuts an inner liner surface of the fitting liner to facilitate securing the body section of the fitting liner directly against the inner body surface of the fitting body.

7. The pipeline system of claim 1, wherein:
the fitting body is implemented at least in part using metal; and
the fitting liner is implemented at least in part using a ceramic material, a polymer material, or both.

8. The pipeline system of claim 1, comprising another pipe fitting configured to be secured to the pipe fitting, wherein:
the other pipe fitting comprises:
another fitting body that defines another fitting bore of the other pipe fitting; and
another fitting liner configured to be secured in the other fitting bore of the other pipe fitting such that another body section of the other fitting liner is secured directly against another inner body surface of the other fitting body to facilitate blocking the solid particle in the slurry from contacting the other fitting body of the other pipe fitting.

9. The pipeline system of claim 1, comprising another pipe fitting configured to be secured to the pipe fitting, wherein:
the other pipe fitting comprises another fitting body that defines another fitting bore of the other pipe fitting; and
the fitting liner of the pipe fitting is configured to be secured in the fitting bore of the pipe fitting as well as the other fitting bore of the other pipe fitting such that the fitting liner is secured directly against another inner body surface of the other fitting body to facilitate blocking the solid particle in the slurry from contacting the other fitting body of the other pipe fitting.

10. The pipeline system of claim 1, wherein the fitting liner of the pipe fitting is configured to be replaced with a different fitting liner when an erosion state associated with the fitting liner is reduced below a threshold erosion state.

11. A method of implementing a pipeline system comprising:
implementing a fitting body of a pipe fitting to define a fitting bore with a female taper, wherein the pipe fitting is to be secured to a pipe segment at least in part by securing tubing of the pipe segment around the fitting body of the pipe fitting;
implementing a fitting jacket circumferentially around the fitting body to define a tubing cavity in which the tubing of the pipe segment is to be secured and sealed;
implementing a fitting liner to be secured in the fitting bore of the pipe fitting such that an outer surface of the fitting liner comprises a male taper that facilitates securing the fitting liner in the fitting bore of the pipe fitting at least in part by directly abutting the female taper implemented on an inner surface of the fitting body to facilitate blocking a slurry that flows through the pipe fitting from eroding the fitting body of the pipe fitting;
implementing a cavity seal circumferentially around the fitting body of the pipe fitting to enable the cavity seal to be compressed between an outer surface of the fitting body and an inner layer of the pipe segment tubing to facilitate blocking the slurry that flows through the pipe fitting from flowing between the outer surface of the fitting body and the inner layer of the pipe segment tubing; and
implementing a liner seal circumferentially around the fitting liner to enable the liner seal to be compressed between the inner surface of the fitting body and an outer surface of the fitting liner to facilitate blocking the slurry that flows through the pipe fitting from flowing between the inner surface of the fitting body and the outer surface of the fitting liner.

12. The method of claim 11, comprising:
securing the fitting body of the pipe fitting to the pipe segment tubing at least in part by conformally deforming the fitting jacket of the pipe fitting around the pipe segment tubing that is present within the tubing cavity of the pipe fitting; and
securing the fitting liner in the fitting bore of the pipe fitting after the fitting body of the pipe fitting is secured to the pipe segment tubing.

13. The method of claim 11, comprising:
securing a flange to the fitting body of the pipe fitting; and
securing the pipe fitting to another pipeline component at least in part by securing the flange of the pipe fitting to the other pipeline component.

14. The method of claim 11, comprising:
securing the fitting liner in the fitting bore of the pipe fitting;
determining an erosion state associated with the fitting liner, wherein the erosion state associated with the fitting liner is indicative of remaining thickness of the fitting liner; and
when the erosion state associated with the fitting liner is less than a threshold erosion state:
removing the fitting liner from the fitting bore of the pipe fitting; and
securing a different fitting liner in the fitting bore of the pipe fitting.

15. A system, comprising:
a pipe fitting, wherein the pipe fitting comprises a fitting body having an inner body surface that defines a fitting bore of the pipe fitting with a female taper; and
a fitting liner, wherein the fitting liner comprises a body section configured to directly abut the inner body surface of the fitting body, wherein the body section of the fitting liner comprises:
an outer liner surface having a male taper that is configured to matingly engage the female taper on the inner body surface of the fitting body to facilitate anchoring the fitting liner in the pipe fitting while a solid particle passes through the pipe fitting to enable the fitting liner to block the solid particle from contacting the inner body surface of the fitting body;
an inner liner surface configured to define a liner bore comprising a cylindrical section that has a constant diameter and that radially overlaps with the male taper on the outer liner surface; and a tapered end, wherein the inner liner surface is configured to define a coned section of the liner bore that corresponds with the tapered end;

wherein the pipe fitting further comprises:
a fitting jacket implemented circumferentially around the fitting body to define a tubing cavity, and wherein:
the fitting body further comprises:
a fitting tube that defines the fitting bore of the pipe fitting; and
a grab ring implemented circumferentially around the fitting tube;
tubing of a pipe segment is configured to be inserted into the tubing cavity; and
the fitting jacket is configured to be conformally deformed around the tubing of the pipe segment to facilitate securing the pipe fitting to the pipe segment, wherein the grab ring of the fitting body is configured to matingly interlock with a grab plate of a swage machine that operates to facilitate conformally deforming the fitting jacket of the pipe fitting around the tubing of the pipe segment.

16. The system of claim 15, wherein:
the pipe fitting is configured to be secured to another pipe fitting; and
the fitting liner is configured to be secured within another fitting bore of the another pipe fitting.

17. The system of claim 15, wherein:
the pipe fitting comprises a flange; and
the fitting liner comprises a flange section that is integrated with the body section of the fitting liner, wherein the flange section is configured to be secured to the flange of the pipe fitting.

18. The system of claim 15, comprising:
a cavity seal configured to be disposed circumferentially around the fitting body of the pipe fitting to enable the cavity seal to be compressed between an outer body surface of the fitting body and an inner layer of a pipe segment to facilitate blocking the solid particle from flowing between the outer body surface of the fitting body and the inner layer of the pipe segment; and
a liner seal configured to be disposed circumferentially around the fitting liner to enable the liner seal to be compressed between the outer liner surface of the fitting liner and the inner body surface of the fitting body to facilitate blocking the solid particle from flowing between the outer liner surface of the fitting liner and the inner body surface of the fitting body.

19. The system of claim 15, wherein the tapered end of the fitting liner is configured to taper radially outward toward the fitting body of the pipe fitting.

* * * * *